United States Patent
Yamai et al.

[11] Patent Number: 5,804,939
[45] Date of Patent: Sep. 8, 1998

[54] BRUSHLESS D.C. MOTOR DRIVING AND CONTROLLING METHOD AND APPARATUS THEREFOR AND ELECTRICAL EQUIPMENT

[76] Inventors: Hiroyuki Yamai; Kazunobu Ooyama; Taizou Kimura, all of c/o Daikin Industries, Ltd., Shiga-seisakusho, 1000-2, Aza Ootani, Okamoto-cho, Kusatsu-shi, Shiga 525, Japan

[21] Appl. No.: 553,518

[22] PCT Filed: Mar. 30, 1995

[86] PCT No.: PCT/JP95/00639

§ 371 Date: Apr. 18, 1996

§ 102(e) Date: Apr. 18, 1996

[87] PCT Pub. No.: WO95/27328

PCT Pub. Date: Oct. 12, 1995

[30] Foreign Application Priority Data

Mar. 31, 1994 [JP] Japan .................................. 6-062503

[51] Int. Cl.⁶ .................................................. H02P 6/06
[52] U.S. Cl. ........................ 318/439; 318/138; 318/254
[58] Field of Search ................................. 318/138, 139, 318/245, 254, 439, 701, 696, 685, 707, 709, 800, 801, 807, 811, 618, 603; 363/26, 134

[56] References Cited

U.S. PATENT DOCUMENTS

| | | | |
|---|---|---|---|
| 3,949,283 | 4/1976 | Okuyama et al. | 318/138 |
| 4,641,066 | 2/1987 | Nagata et al. | 318/254 |
| 4,782,272 | 11/1988 | Buckley et al. | 318/254 |
| 4,950,960 | 8/1990 | Krefta et al. | 318/254 |
| 5,355,069 | 10/1994 | Bahn | 318/701 |
| 5,374,880 | 12/1994 | Kondoh et al. | 318/254 |
| 5,376,866 | 12/1994 | Erdman | 318/254 |
| 5,463,299 | 10/1995 | Futami et al. | 318/618 |
| 5,486,743 | 1/1996 | Nagai | 318/439 |
| 5,491,393 | 2/1996 | Uesugi | 318/439 |

FOREIGN PATENT DOCUMENTS

| | | |
|---|---|---|
| 60-194782 | 10/1985 | Japan . |
| 62-166794 | 7/1987 | Japan . |
| 1-255494 | 10/1989 | Japan . |
| 4-275091 | 9/1992 | Japan . |

*Primary Examiner*—Paul Ip
*Attorney, Agent, or Firm*—Beveridge, Degrandi, Weilacher & Young LLP

[57] ABSTRACT

When a brushless D.C. motor 3, 13 is driven by voltage-fed inverters 2, 5, 12, 20, a conducting interval of the voltage-fed inverters 2, 5, 12, 20 is determined to be greater than 120° and equal or less than 180° by electrical angle so that improvement in efficiency and enlargement in operating range of the brushless D.C. motor is achieved with simple and cheap controlling.

17 Claims, 19 Drawing Sheets

BRUSHLESS D.C. MOTOR DRIVING AND CONTROLLING METHOD AND APPARATUS THEREFOR AND ELECTRICAL EQUIPMENT

TECHNICAL FIELD

The present invention relates to a brushless D.C. motor driving and controlling method and apparatus therefor. More particularly, the present invention relates to a brushless D.C. motor driving and controlling method and apparatus which drive a brushless D.C. motor using voltage-fed inverters, and to electrical equipment which employs a brushless D.C. motor as a driving source which is driven and controlled by the brushless D.C. motor driving and controlling apparatus.

BACKGROUND ART

A brushless D.C. motor is known as a motor having higher efficiency in comparison to an A.C. motor. The rotor of a brushless D.C. motor is equipped with permanent magnets instead of rotor windings, therefore secondary copper losses caused by currents flowing in the rotor windings is eliminated.

It is known that a brushless D.C. motor has a remarkable efficiency improving effect in comparison to an A.C. motor when the brushless D.C. motor has a medium or small capacity which is equal or less than several tens kW.

In a brushless D.C. motor driving system having such capacity, voltage-fed inverters or current control type inverters are employed as inverters for driving a brushless D.C. motor. Wherein, the current control type the inverters has a main circuitry arrangement which is the same to that of voltage-fed inverters, and controls the inverters so as to determine a motor current to be a desired value.

A system which drives a brushless D.C. motor using the voltage-fed inverters, is mainly used on devices which require efficient power consumption (improvement in efficiency), and is manufactured in large quantities, such as air conditioners, vacuum cleaners, electric washers and others. Therefore, a waveform having a conducting interval which is 120° by electrical angle, is employed as a waveform control in inverters from the point of view of easiness in controlling. And, a system is employed which has a simple arrangement and which is cheap. (refer to "Microcomputer-Controlled Brushless Motor Without a Shift-Mounted Position Sensor", T.Endo et. al., IPEC-Tokyo'83,pp.1477–1488,1983: "Controlling Apparatus of a Brushless D.C. Motor", Nagata et. al., Japanese Patent Laid Open Gazett Tokuganhei 5-72197: "P.M.Brushless Motor Drives:A self-Commutating System without Rotor-Position Sensors", P.Ferraris et. al.,Ninth Annual Symposium-Incremental Motion Control Systems and Devices, pp.305–312,1980) Further, Magnetic pole position detection by detection of induced voltages of a motor, or by a magnetic pole position detection sensor having a simple arrangement and employing Hall elements and the like is employed in detecting magnetic pole position of a brushless D.C. motor. A rotational position sensor which is expensive, such as a rotary encoder and the like, is not employed as it is not economical.

A system which drives a brushless D.C. motor using the current control type inverters, is typically applied to machine tools, servo-motor for an industrial robot, and others which require rapid torque response and the low torque ripple.

In this system, a closed loop arrangement is employed in which a control circuitry determines output voltages of inverters so that current waveforms are the desired waveforms. This is so because the currents and torques of a brushless D.C. motor are functions of rotational position and are in proportional relationship. Therefore, the system has an expensive system arrangement which employs a precision sensor for detecting rotational position of a motor, current detectors for accurately controlling motor currents and a controller which can perform high-speed processing. Further, output voltages of inverters continuously vary because the inverters are controlled instantaneously in response to the conditions of the motor.

In the system in which a brushless D.C. motor is driven using conventional voltage-fed inverters, a switch of each phase of inverters is turned on for only an electrical angle of 120° in spite of positive and negative electrical angles of 180°, respectively. Therefore, the term of the remaining electrical angle of 60° (the term of electrical angle of 120° for one cycle) is non-controlled condition.

Consequently, inverters cannot output desired voltages during the term of non-controlled condition so that the available rate of d.c. voltage in the inverters is low. And, terminal voltages of a brushless D.C. motor become small and an operating range becomes narrower (a maximum number of revolution becomes smaller) due to the low available rate of d.c. voltage.

Further, motor currents should be increased for obtaining an output which is the same to that of a motor which is supplied terminal voltages which are not lowered, because the terminal voltages are lowered. As a result, joule losses which are caused by resistances of motor windings, increase so that efficiency of a brushless D.C. motor cannot be improved to an expected degree.

Although, permanent magnets are installed to a rotor of a brushless D.C. motor so that each permanent magnet corresponds to the electrical angle of 180°, currents can be flowed in desired directions for only an electrical angle of 120° so that available rate of magnetic flux is small. In other words, motor currents should be increased for obtaining a torque which is the same to that of a motor which does not have the available rate of magnetic flux lowered. As a result, joule losses which are caused by resistances of motor windings, increase so that efficiency of a brushless D.C. motor cannot be improved to an expected degree.

DISCLOSURE OF THE INVENTION

The present invention was made in view of the above-mentioned problems.

It is an object of the present invention to supply a brushless D.C. motor driving and controlling method and apparatus therefor which improve available rates of voltage of voltage-fed inverters and motor flux using simple and cheap control, and which achieves higher efficiency and enlargement of the operating range of a brushless D.C. motor.

It is another object of the present invention to supply to electrical equipment which employs a brushless D.C. motor as a driving source, a motor which is driven and controlled by the brushless D.C. motor driving and controlling apparatus.

A brushless D.C. motor driving and controlling method according to claim 1 is a method which determines a conducting interval of voltage-fed inverters to be a predetermined interval which is more than 120° and equal or less than 180° by electrical angle.

A brushless D.C. motor driving and controlling method according to claim 2 is a method which modulates outputs of voltage-fed inverters so as to output pulse signals, each pulse signal having constant pulse width within an entire conducting interval.

A brushless D.C. motor driving and controlling method according to claim 3 is a method which employs a rotor which includes permanent magnets in the interior of the rotor, as a rotor of a brushless D.C. motor.

A brushless D.C. motor driving and controlling method according to claim 4 is a method which controls voltage-fed inverters so that a phase of inverter output voltage is advanced from a phase of the inverter output voltage with respect to an induced voltage of a brushless D.C. motor, the latter phase being a phase in which a brushless D.C. motor current and the induced voltage of the brushless D.C. motor are in phase.

A brushless D.C. motor driving and controlling method according to claim 5 is a method which determines a conducting interval of voltage-fed inverters to be 180° by electrical angle.

A brushless D.C. motor driving and controlling method according to claim 6 is a method which obtains a first voltage at a neutral point from an end of resistors, which are connected to each output terminal of voltage-fed inverters, obtains a second voltage at a neutral point from one ends of stator windings of a brushless D.C. motor, and detects a magnetic pole position of a rotor of the brushless D.C. motor based upon a difference between the first voltage and the second voltage.

A brushless D.C. motor driving and controlling method according to claim 7 is a method which determines a conducting interval of voltage-fed inverters to be a predetermined interval which is more than 120° and less than 180° by electrical angle.

A brushless D.C. motor driving and controlling method according to claim 8 is a method which determines a conducting interval of voltage-fed inverters to be a predetermined interval which is equal or more than 140° and equal or less than 170° by electrical angle.

A brushless D.C. motor driving and controlling apparatus according to claim 9 includes a conducting interval determining means for determining a conducting interval of voltage-fed inverters to be a predetermined interval which is more than 120° and equal or less than 180° by electrical angle.

A brushless D.C. motor driving and controlling apparatus according to claim 10 further includes a modulating means for modulating outputs of voltage-fed inverters so as to output pulse signals, each pulse signal having constant pulse width within an entire conducting interval.

A brushless D.C. motor driving and controlling apparatus according to claim 11 employs a rotor which includes permanent magnets in the interior of the rotor, as a rotor of a brushless D.C. motor.

A brushless D.C. motor driving and controlling apparatus according to claim 12 includes a phase controlling means for controlling voltage-fed inverters so that a phase of inverter output voltage is advanced from a phase of the inverter output voltage with respect to an induced voltage of a brushless D.C. motor, the latter phase being a phase which makes a brushless D.C. motor current and the induced voltage of the brushless D.C. motor to be the same phase to one another.

A brushless D.C. motor driving and controlling apparatus according to claim 13 includes a conducting interval determining means for determining a conducting interval of voltage-fed inverters to be 180° by electrical angle.

A brushless D.C. motor driving and controlling apparatus according to claim 14 further includes a difference voltage outputing means for receiving a first voltage at a neutral point which is obtained by from one end of resistors, which are connected to each output terminal of voltage-fed inverters, a second voltage at a neutral point which is obtained from one end of stator windings of a brushless D.C. motor, and for outputing a difference voltage between the first voltage and the second voltage, and a rotor position detecting means for detecting a magnetic pole position of a rotor of the brushless D.C. motor based upon the difference voltage.

A brushless D.C. motor driving and controlling apparatus according to claim 15 employs a conducting interval determining means for determining a conducting interval of voltage-fed inverters to be a predetermined interval which is more than 120° and less than 180° by electrical angle.

A brushless D.C. motor driving and controlling apparatus according to claim 16 employs a conducting interval determining means for determining a conducting interval of voltage-fed inverters to be a predetermined interval which is equal or more than 140° and equal or less than 170° by electrical angle.

Electrical equipment according to claim 17 employs a brushless D.C. motor as a driving source which motor is driven and controlled by one of the brushless D.C. motor driving and controlling apparatus according to claims 9 through 16.

As to the brushless D.C. motor driving and controlling method according to claim 1, the method determines a conducting interval of voltage-fed inverters to be a predetermined interval which is more than 120° and equal or less than 180° by electrical angle when a brushless D.C. motor is driven by voltage-fed inverters. Therefore, the method determines non-control term to be less than 60° by electrical angle. As a result, the method increases motor terminal voltages and expands the operating range. Further, an increase of motor current is suppressed so that an increase of joule losses due to motor windings are suppressed and efficiency of the brushless D.C. motor is improved, because the motor terminal voltages can be increased. Further, a current can be forcibly flowed in a desired direction in correspondence to an extent of permanent magnets which is installed to the rotor of the brushless D.C. motor, the extent being greater than 120° by electrical angle. Therefore, lowering of available rate of magnetic flux is suppressed and efficiency of the brushless D.C. motor is improved.

As to the brushless D.C. motor driving and controlling method according to claim 2, the method modulates outputs of voltage-fed inverters so as to output pulse signals, each pulse signal having constant pulse width within an entire conducting interval. Therefore, magnetic pole position detection with high accuracy is not needed, and controlling is simplified. Also, the method improves efficiency and increases an amplitude of a fundamental wave in comparison to a case in which variable pulse width modulation is performed. The variable pulse width modulation varies pulse widthes of the pulse signal. Consequently, a maximum number of revolution of the brushless D.C. motor is increased.

As to the brushless D.C. motor driving and controlling method according to claim 3, the method employs a rotor which includes permanent magnets in the interior of the rotor, as a rotor of a brushless D.C. motor. Therefore, the method generates not only a torque caused by the magnet but also a torque caused by reluctance so that generated torque as a whole is increased without increasing motor currents. Further, inductance of motor windings is extremely increased in comparison to that of a brushless D.C. motor in which permanent magnets are installed on a surface of a rotor, so that operating with higher speed can be achieved in comparison to that of the brushless D.C. motor in which permanent magnets are installed on the surface of the rotor. Furthermore, the method decreases a current ripple due to low order higher harmonics components of inverters, because inductance of motor windings is great. Therefore, the method decreases a torque ripple.

As to the brushless D.C. motor driving and controlling method according to claim 4, the method controls voltage-fed inverters so that a phase of inverter output voltage is advanced from a phase of the inverter output voltage with respect to an induced voltage of a brushless D.C. motor, the latter phase being a phase which makes a brushless D.C. motor current and the induced voltage of the brushless D.C. motor to be the same phase to one another. Therefore, influence of inductance in a direction which is shifted by 90° electrically from a direction of magnetic flux generated by a permanent magnet, is efficiently and practically used. As a result, a current waveform is appoximated to be a sine wave. Consequently, torque ripple is further reduced and motor efficiency is further improved. Furthermore, reluctance torque and field weakening effects are efficiently and practically utilized.

As to the brushless D.C. motor driving and controlling method according to claim 5, the method determines a conducting interval of voltage-fed inverters to be 180° by electrical angle. Therefore, a non-control term is determined to be 0° by electrical angle. Control of the conducting interval within an extent which is smaller than 60°, is not necessary, because the conducting interval is 180°. Therefore, when the control is performed using a microcomputer, a number of timers are decreased by 1 and interrupt handlings are reduced by 1 in comparison to a case in which the conducting interval is determined to be greater than 120° and less than 180°. Consequently, the control and arrangement is simplified. When the control is performed using a hardware, a number of timer-counter is decreased by 1 in comparison to a case in which the conducting interval is determined to be greater than 120° and less than 180°. Consequently, the control and arrangement is simplified.

As to the brushless D.C. motor driving and controlling method according to claim 6, the method obtains a first voltage at a neutral point from one end of resistors. Which are connected to each output terminal of voltage-fed inverters, obtains a second voltage at a neutral point from one end of stator windings of a brushless D.C. motor, and detects a magnetic pole position of a rotor of the brushless D.C. motor based upon a difference between the first voltage and the second voltage. Therefore, the magnetic pole position of the rotor is detected in spite of the revolution speed, conducting angle, and amplitude of motor current, without especially providing a sensor for detecting magnetic pole position of the rotor.

As to the brushless D.C. motor driving and controlling method according to claim 7, the method determines a conducting interval of voltage-fed inverters to be a predetermined interval which is more than 120° and less than 180° by electrical angle. Therefore, the difference signal between the voltages and an integrated signal which is used to detect magnetyic pole position of a motor rotor, is stabilized so that reliability is improved.

As to the brushless D.C. motor driving and controlling method according to claim 8, the method determines a conducting interval of voltage-fed inverters to be a predetermined interval which is equal or more than 140° and equal or less than 170° by electrical angle. Therefore, motor efficiency and operating range are scarcely detracted. And, the difference signal between the voltages and an integrated signal is further stabilized so that reliability is further improved.

As to the brushless D.C. motor driving and controlling apparatus according to claim 9, when a brushless D.C. motor is driven by voltage-fed inverters, the conducting interval determining means determins a conducting interval of voltage-fed inverters to be a predetermined interval which is more than 120° and equal or less than 180° by electrical angle. Therefore, the apparatus determines the non-control term to be less than 60° by electrical angle. As a result, the apparatus increases motor terminal voltages and expands an operating range. Further, a quantity in increase of motor currents is suppressed so that an increase of joule losses due to motor windings is suppressed and efficiency of the brushless D.C. motor is improved, because the motor terminal voltages can be increased. Further, a current can be forcibly flowed in a desired direction in correspondence to an extent of permanent magnets which are installed onto the rotor of the brushless D.C. motor, the extent being greater than 120° by electrical angle. Therefore, lowering of available rate of magnetic flux is suppressed and efficiency of the brushless D.C. motor is improved.

As to the brushless D.C. motor driving and controlling apparatus according to claim 10, the modulating means modulates outputs of voltage-fed inverters so as to output pulse signals, each pulse signal having constant pulse widths within an entire conducting interval. Therefore, magnetic pole position detection with high accuracy is not needed, and controlling is simplified. Also, the apparatus improves efficiency and increases an amplitude of a fundamental wave in comparison to a case in which variable pulse width modulation is performed. The variable pulse width modulation varies pulse widths of the pulse signal. Consequently, a maximum number of revolution of the brushless D.C. motor is increased.

As to the brushless D.C. motor driving and controlling apparatus according to claim 11, the apparatus employs a rotor which includes permanent magnets in the interior of the rotor, as a rotor of a brushless D.C. motor. Therefore, the apparatus generates not only a torque caused by the magnet but also a torque caused by reluctance so that generated torque as a whole is increased without increasing motor currents. Further, inductance of motor windings is extremely increased in comparison to that of a brushless D.C. motor in which permanent magnets are installed on a surface of a rotor, so that higher speed operating can be achieved in comparison to that of the brushless D.C. motor in which permanent magnets are installed on the surface of the rotor. Furthermore, the apparatus decreases a current ripple due to low order higher harmonics components of inverters, because inductance of motor windings is great. Therefore, the apparatus decreases a torque ripple.

As to the brushless D.C. motor driving and controlling apparatus according to claim 12, the phase controlling means controls voltage-fed inverters so that a phase of inverter output voltage is advanced from a phase of the inverter output voltage with respect to an induced voltage of a brushless D.C. motor, the latter phase being a phase which makes a brushless D.C. motor current and the induced voltage of the brushless D.C. motor to be the same phase to one another. Therefore, influence of inductance in a direction which is shifted by 90° electrically from a direction of magnetic flux generated by a permanent magnet, is efficiently and practically utilized. As a result, a current waveform is appoximated to be a sine wave. Consequently, torque ripple is further reduced and motor efficiency is further improved. Furthermore, reluctance torque and field weakening effects are efficiently and practically utilized.

As to the brushless D.C. motor driving and controlling apparatus according to claim 13, the conducting interval determining means determins a conducting interval of voltage-fed inverters to be 180° by electrical angle. Therefore, a non-control term is determined to be 0° by electrical angle. Control of the conducting interval within an extent which is smaller than 60°, is not necessary, because the conducting interval is 180°. Therefore, when the control is performed using a microcomputer, a number of timers is decreased by 1 and interrupt handlings are reduced by 1 in comparison to a case in which the conducting interval is determined to be greater than 120° and less than 180°. Consequently, the control and arrangement is simplified. When the control is performed using hardware, a number of timer-counter is decreased by 1 in comparison to a case in which the conducting interval is determined to be greater than 120° and less than 180°. Consequently, the control and arrangement is simplified.

As to the brushless D.C. motor driving and controlling apparatus according to claim 14, the apparatus obtains a first voltage at a neutral point from resistors which are connected at one end to one another and are connected at their other ends to each output terminal of voltage-fed inverters, obtains a second voltage at a neutral point which is obtained at the connected ends of stator windings of a brushless D.C. motor which windings are connected to one another, and the difference voltage outputing means outputs a difference voltage between the first voltage and the second voltage, and the rotor position detecting means detects a magnetic pole position of a rotor of the brushless D.C. motor based upon the difference voltage. Therefore, the magnetic pole position of the rotor is detected in spite of the revolution speed, conducting angle, and amplitude of motor current, without especially providing a sensor for detecting magnetic pole position of the rotor.

As to the brushless D.C. motor driving and controlling apparatus according to claim 15, the apparatus employs a conducting interval determining means for determining a conducting interval of voltage-fed inverters to be a predetermined interval which is more than 120° and less than 180° by electrical angle. Therefore, the difference signal between the voltages a an integrated signal which is used to detect magnetic pole position of a motor rotor, is stabilized so that reliability is improved.

As to the brushless D.C. motor driving and controlling apparatus according to claim 16, the apparatus employs a conducting interval determining means for determining a conducting interval of voltage-fed inverters to be a predetermined interval which is equal or more than 140° and equal or less than 170° by electrical angle. Therefore, motor efficiency and operating range are scarcely detracted. And, the difference signal between the voltages or an integrated signal is further stabilized so that reliability is further improved.

As to the electrical equipment according to claim 17, the equipment employs a brushless D.C. motor as a driving source which motor is driven and controlled by one of the brushless D.C. motor driving and controlling apparatus according to claims 9 through 16. Therefore, reduced power consumption is achieved due to the improvement of higher efficiency of a brushless D.C. motor which is the driving source.

The present invention is described in more detail.

When a brushless D.C. motor is driven by voltage-fed inverters which have a conducting interval of 120° by electrical angle, ideal current waveforms and an ideally generated torque are illustrated in FIGS. 1(A) through 1(D). A brushless D.C. motor is a motor which replaces mechanical commutators of a d.c. motor with inverters. Therefore, when inverters are controlled so that each current of three phases (U, V, W) is joined at every 120° so as to make a motor current to be a direct current, a generated torque becomes similar to that of a d.c. motor, as is illustrated in FIG. 1(D).

A simulation result is illustrated in FIGS. 2(A) and 2(B) which simulation is carried out by the inventors of the present invention and is carried out for a current waveform and generated torque when a brushless D.C. motor is driven by voltage-fed inverters which has a conducting interval of 180° by electrical angle. In this case, portions are generated in which a current of each phase overlaps one another so that the brushless D.C. motor performs an operation which is different from that of a d.c. motor, because currents flow for a 180° term. As a result, ripple in the generated torque becomes great {refer to FIG. 2(B)}.

From the above point of view, it is conventionally thought that voltage-fed inverters which has a conducting interval of 120° by electrical angle, is ideal for driving a brushless D.C. motor. Therefore, only a method which employs a conducting interval of 120° by electrical angle, is proposed and is available as a driving method of a brushless D.C. motor which driving method uses magnetic pole position detection based upon detection of induced voltages of a motor. But, when the inventors drives a brushless D.C. motor using voltage-fed inverters which has a conducting interval of 120° by electrical angle, the inventors have found that ideal waveforms illustrated in FIGS. 1 are not obtained, and that waveforms illustrated in FIGS. 3(A) and 3(B) are obtained, and that the waveforms illustrated in FIGS. 3(A) and 3(B) are similar to the waveforms illustrated in FIGS. 2(A) and 2(B). When FIG. 2(B) and FIG. 3(B) are compared to one another, it is understood that amplitudes of both torque ripple are in nearly the same degree to one another. It seems the reason that motor current cannot be controlled in a desired manner (controlled to be a rectangular waveform) when voltage-fed inverters employs a simple control is employed. Therefore, it becomes clear that lowering in efficiency and decreasing in operating range are not realized, the lowering and the decreasing being apprehended when a brushless D.C. motor is driven with a conducting interval of 180° by electrical angle. Rather, it becomes clear that efficiency of a brushless D.C. motor is improved by reduction of joule losses and depression of lowering in flux available rate.

Further, when voltage-fed inverters which has a conducting interval exceeding 120° (other than 180°), portions are inevitably generated in which a current of each phase overlaps one another so that a character seems to be obtained which is similar to that of voltage-fed inverters with a conducting interval of 180° by electrical angle.

Furthermore, in the voltage-fed inverters with a conducting interval of 120° by electrical angle, the character is improved by approximating each current waveform to a rectangular wave, as is illustrated in FIGS. 1(A) through 1(C). On the contrary, in the voltage-fed inverters with a conducting interval of 180° by electrical angle, the character seems to be improved by smoothing each current waveform because each current flows in the entire interval.

The present invention was made based upon the above findings.

BRIEF DESCRIPTION OF THE DRAWINGS

FIGS. 24 are diagrams illustrating a motor current and an integration signal of a position detector when a conducting interval of 180° by electrical angle, is employed;

FIGS. 25 are diagrams illustrating a motor current and an integration signal of a position detector when a conducting interval of 120° by electrical angle, is employed;

FIGS. 26 are diagrams illustrating a motor current and an integration signal of a position detector when a conducting interval of 130° by electrical angle, is employed;

FIGS. 27 are diagrams illustrating a motor current and an integration signal of a position detector when a conducting interval of 140° by electrical angle, is employed;

FIGS. 28 are diagrams illustrating a motor current and an integration signal of a position detector when a conducting interval of 150° by electrical angle, is employed;

FIGS. 29 are diagrams illustrating a motor current and an integration signal of a position detector when a conducting interval of 160° by electrical angle, is employed;

FIGS. 30 are diagrams illustrating a motor current and an integration signal of a position detector when a conducting interval of 170° by electrical angle, is employed;

FIG. 31 is a diagram illustrating operating ranges of a brushless D.C. motor when a conducting interval is determined to be 120°, 130°, 140°, 150°, 180° by electrical angle, respectively, and input currents are determined to be the same; and FIG. 32 is a diagram illustrating motor efficiencies of a brushless D.C. motor when a conducting interval is determined to be 120°, 130°, 140°, 150°, 180° by electrical angle, respectively, and input currents are determined to be the same to one another.

BEST MODE FOR IMPLEMENTING THE INVENTION

Hereinafter, referring to the attached drawings, we explain the present invention in detal.

Figure 4:
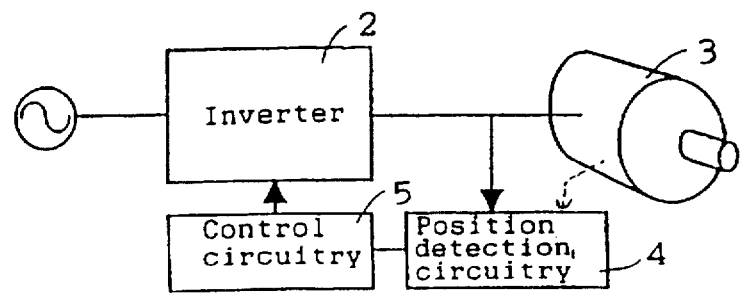
FIG. 4 is a schematic block diagram illustrating an embodiment of a brushless D.C. motor driving and controlling apparatus according to the present invention.

FIG. 4 is a schematic block diagram illustrating an embodiment of a brushless D.C. motor driving and controlling apparatus according to the present invention. Output voltages of inverters 2 are supplied to a brushless D.C. motor 3. A second voltage at a neutral point is obtained by Y-connecting induced voltages of the brushless D.C. motor 3 or by Y-connecting stator windings of each phase of the brushless D.C. motor 3. A first voltage at a neutral point is obtained by Y-connecting resistors between output terminals of each phase of the inverters 2. A motor position detection circuitry 4 receives a difference voltage between the first voltage and the second voltage. An output signal from the motor position detection circuitry 4 is supplied to a control circuitry 5. The control circuitry 5 generates a control command for determining a conducting interval to be more than 120° and equal to or less than 180° by electrical angle, and supplies the control command to the inverters 2. When the control circuitry 5 generates a control command for determining the conducting interval to be equal to 180° by electrical angle and supplies the control command to the inverters 2, the difference voltage should be supplied to the motor position detection circuitry 4. But when the control circuitry 5 generates a control command for determining the conducting interval to be less than 180° by electrical angle and supplies the control command to the inverters 2, the induced voltages or difference voltage may be supplied to the motor position detection circuitry 4.

Therefore, a detection signal corresponding to a magnetic pole position of a motor rotor is obtained by the motor position detection circuitry 4 based upon the induced voltages of the brushless D.C. motor 3 or the difference voltage between the first and second voltages. The control circuitry 5 generates the control command based upon the magnetic pole position detection signal. The control command controls switches (not illustrated) the inverters 2 so that the conducting interval is determined to be more than 120° by electrical angle and equal to or less than 180° by electrical angle.

Figure 5:
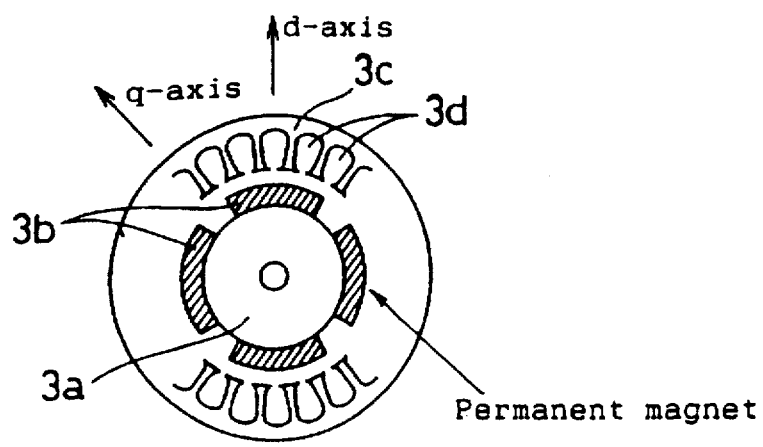
FIG. 5 is a schematic cross sectional view of a brushless D.C. motor in which permanent magnets are installed on a surface of a rotor.

FIG. 5 is a schematic cross sectional view of a brushless D.C. motor in which permanent magnets are installed on a surface of a rotor. Permanent magnets 3b are installed at predetermined position on a surface of a rotor 3a. A stator 3c includes a plurality of slots 3d in which stator windings (not illustrated) are wound. A d-axis which is indicated by an arrow in FIG. 5, is an axis indicating a direction of magnetic flux generated by the permanent magnet 3b. A q-axis is an axis which is shifted 90° electrically with respect to the d-axis.

Figure 6:
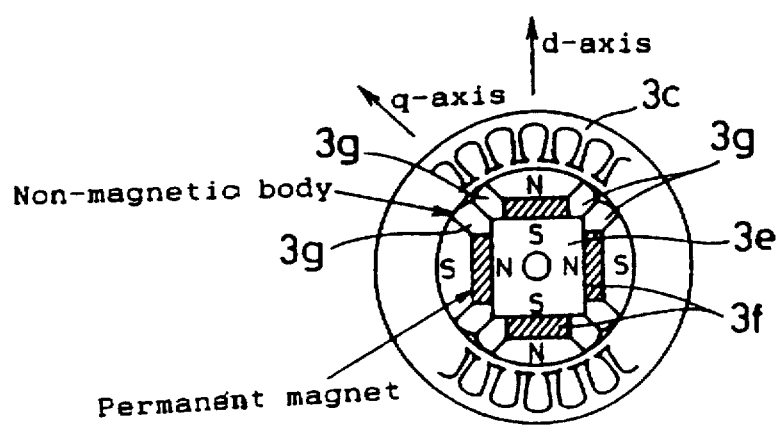
FIG. 6 is a schematic cross sectional view of a brushless D.C. motor in which permanent magnets are installed interior of a rotor.

FIG. 6 is a schematic cross sectional view of a brushless D.C. motor in which permanent magnets are installed interior of a rotor. Permanent magnets 3f are installed such that they are not exposed. Non-magnetic bodies 3g are installed between neighbouring permanent magnets 3f so that short-magnetic circuit between the neighbouring permanent magnets 3f is prevented from occurrence. An arrangement of a stator 3c is similar to that of the brushless D.C. motor illustrated in FIG. 5, therefore decription is omitted.

Figure 7:
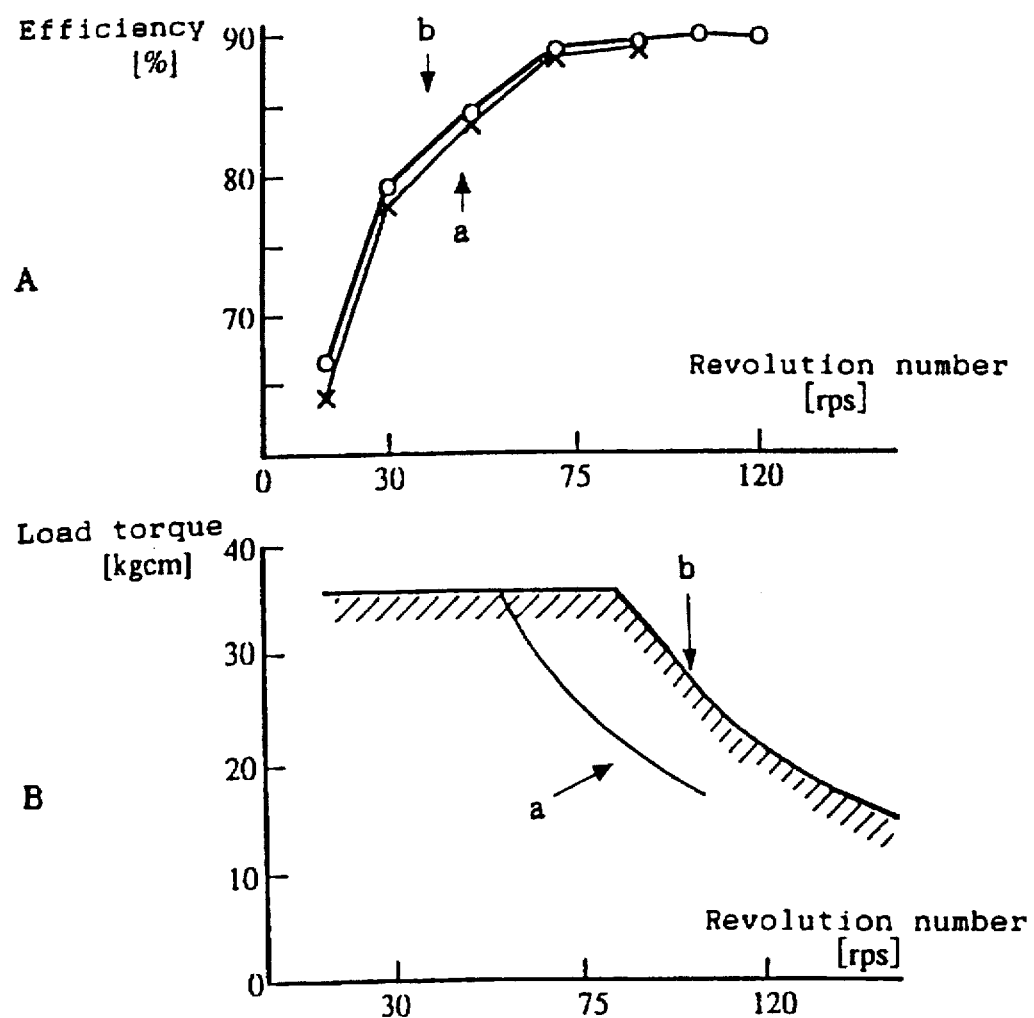
FIGS. 7 are graphs illustrating efficiency-revolution number characteristics and load torque-revolution number characteristics when a brushless D.C. motor having an arrangement illustrated in FIG. 5 is driven by voltage-fed inverters, and a conducting interval is determined to be 120°, 180° by electrical angle, respectively.

FIGS. 7(A) and 7(B) are graphs illustrating efficiency-revolution number characteristics and load torque-revolution number characteristics when a brushless D.C. motor having an arrangement illustrated in FIG. 5 is driven by voltage-fed inverters, and a conducting interval is determined to be 120°, 180° by electrical angle, respectively. In FIG. 7(A), the characteristics are obtained under a condition that load torque is determined to be 20 kg·cm. Also, in the figures, a represents characteristics when a conducting interval is determined to be 120° by electrical angle, and b represents characteristics when a conducting interval is determined to be 180° by electrical angle.

As is apparent from these figures, efficiency is improved, a maximum revolution number is raised, and load torque in a high revolution range is increased, by determining the conducting interval to be 180° by electrical angle.

Figure 8:
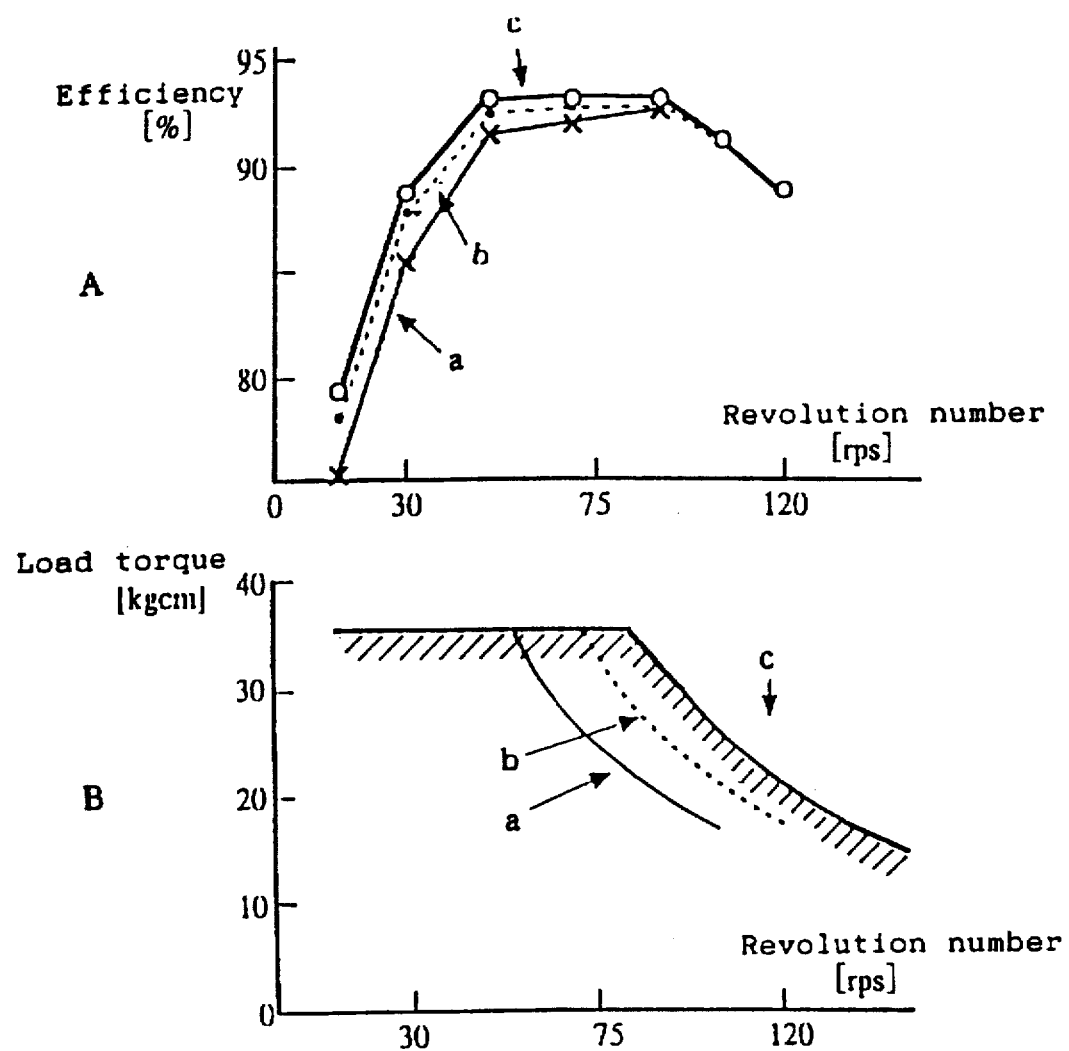
FIGS. 8 are graphs illustrating efficiency-revolution number characteristics and load torque-revolution number characteristics when a brushless D.C. motor having an arrangement illustrated in FIG. 6 is driven by voltage-fed inverters, and a conducting interval is determined to be 120°, 150°, 180° by electrical angle, respectively.

FIGS. 8(A) and 8(B) are graphs illustrating efficiency-revolution number characteristics and load torque-revolution number characteristics when a brushless D.C. motor having an arrangement illustrated in FIG. 6 is driven by voltage-fed inverters, and a conducting interval is determined to be 120°, 150°, 180° by electrical angle, respectively. In FIG. 8(A), characteristics are obtained under a condition that load torque is determined to be 20 kg·cm. Also, in the figures, a represents characteristics when a conducting interval is determined to be 120° by electrical angle, b represents characteristics when a conducting interval is determined to be 150° by electrical angle, and c represents characteristics when a conducting interval is determined to be 180° by electrical angle.

As is apparent from these figures, efficiency is improved, a maximum revolution number is raised, and load torque in a high revolution range is increased, when the conducting interval is high.

Figure 9:
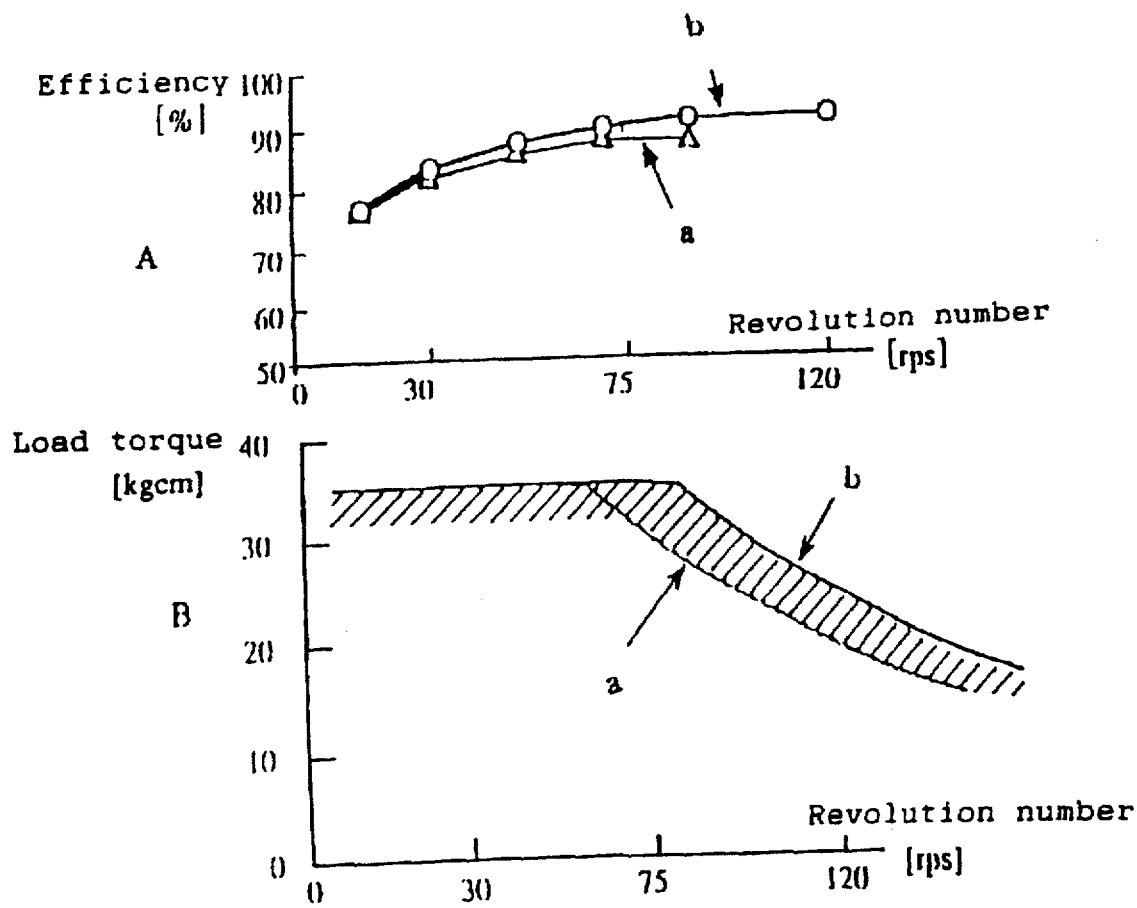
FIGS. 9 are graphs illustrating efficiency-revolution number characteristics and load torque-revolution number characteristics when a brushless D.C. motor having an arrangement illustrated in FIG. 6 is driven by voltage-fed inverters, and the inverter is modulated in a constant pulse width manner and variable pulse width manner, respectively by control circuitry.

FIGS. 9(A) nd 9(B) are graphs illustrating efficiency-revolution number characteristics and load torque-revolution number characteristics when a brushless D.C. motor having an arrangement illustrated in FIG. 6 is driven by voltage-fed inverters, and the inverters are modulated in a constant pulse width manner and variable pulse width manner, respectively by control circuitry. In FIG. 9(A), characteristics are obtained under a condition that load torque is determined to be 20 kg·cm and a conducting interval is determined to be 180° by electrical angle. Also, in the figures, a represents characteristics when variable pulse width modulation is performed, and b represents characteristics when constant pulse width modulation is performed.

Figure 10:
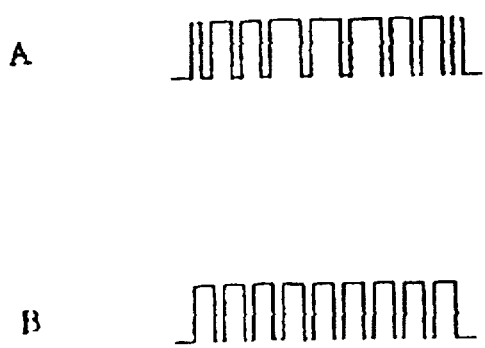
FIGS. 10 are diagrams illustrating constant pulse width modulation and variable pulse width modulation.

The variable pulse width modulation is a method for obtaining a voltage waveform which is equivalent to a sine wave and the like, by varying pulse widthes, as is illustrated in FIG. 10(A). The constant pulse width modulation is a method which does not vary pulse widths at all, as is illustrated in FIG. 10(B).

As is apparent from these characteristics figures, efficiency is improved, a maximum revolution number is raised, and load torque in a high revolution range is increased, by employing the constant pulse width modulation.

Hereinafter, description is made in more detail.

A pulse width modulation method which employs variable pulse widths such as sine wave modulation, is generally employed in other driving and controlling methods for motors and the like, because it is thought that low order higher harmonics waves cause increase in losses and vibration (refer to "Frequency Dependency of Induction Motor Parameters and Their Measuring Method", K.Kawagishi et. al., IPEC-Tokyo'83,pp.202–213,1983). When the method is applied to a brushless D.C. motor, a magnetic pole detection means with high accuracy is needed and control becomes complicated so that a cost as a whole is increased because a modulation signal waveform and a rotor should be synchronized to one another. But, the constant pulse width modulation does not have such disadvantages, and has an amplitude of a fundamental wave which is higher than that of a fundamental wave of variable pulse width modulation. Further, as is apparent from FIGS. 9 which represent the inventors' knowledge, lowering efficiency was not recognized, instead efficiency was improved. Furthermore, vibration was almost inconsiderable when the method was taken in an air conditioner and the like.

Next, a brushless D.C. motor in which permanent magnets are installed on a surface of a rotor, and a brushless D.C. motor in which permanent magnets are installed in the interior of a rotor, are described contradistinctionally in detail (refer to FIGS. 5 and 6).

The brushless D.C. motor in which permanent magnets are installed on a surface of a rotor, which motor is illustrated in FIG. 5, includes permanent magnets 3b which are disposed on a surface of silicon steel plates of the rotor 3a. Therefore, an air gap (a distance between silicon steel plates of the rotor and silicon steel plates of a stator) is great so that inductance of-stator windings become comparatively small. On the contrary, the brushless D.C. motor in which permanent magnets are installed interior of the rotor, which motor is illustrated in FIG. 6, includes permanent magnets 3b which are disposed interior of silicon steel plates of the rotor 3a. Therefore, an air gap is small so that inductance of stator windings become extremely great in comparison to that of the brushless D.C. motor in which permanent magnets are installed on the surface of the rotor, because the permanent magnets are installed interior of the rotor 3e.

Figure 11:
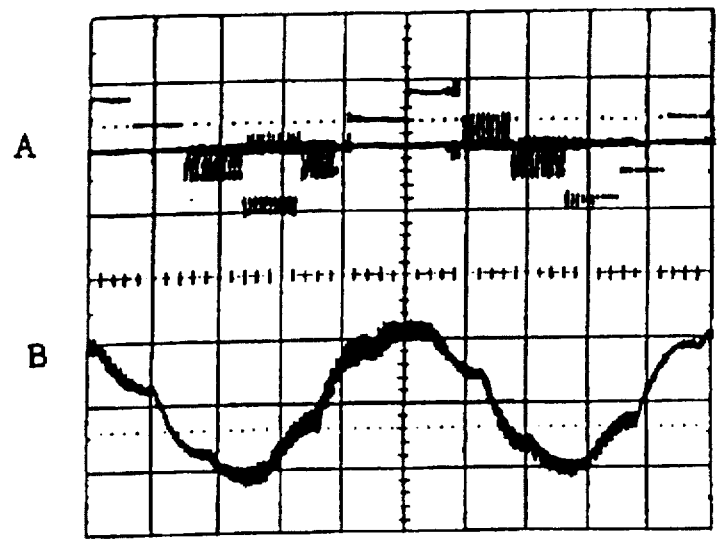
FIGS. 11 are diagrams illustrating a voltage waveform and current waveform when a brushless D.C. motor in which permanent magnets are installed on a surface of a rotor, is driven by voltage-fed inverters with a conducting interval of 180° by electrical angle and outputting constant pulse width modulation waveform.
Figure 12:
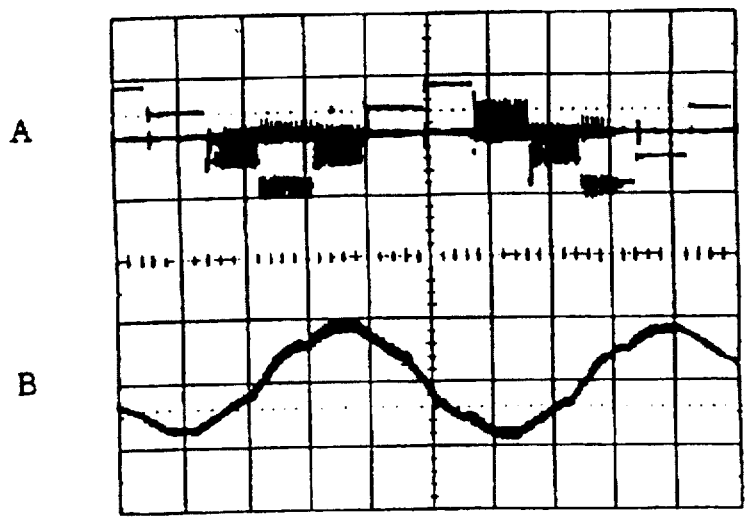
FIGS. 12 are diagrams illustrating a voltage waveform and current waveform when a brushless D.C. motor in which permanent magnets are installed interior of a rotor, is driven by voltage-fed inverters with a conducting interval of 180° by electrical angle and outputting constant pulse width modulation waveform.

FIGS. 11 and 12 are diagrams illustrating a voltage waveform and current waveform when a brushless D.C. motor in which permanent magnets are installed on a surface of a rotor and a brushless D.C. motor in which permanent magnets are installed on the interior of a rotor, is driven, respectively, by voltage-fed inverters with a conducting interval of 180° by electrical angle and outputting constant pulse width modulation waveform. In both figures, voltage waveforms are illustrated in upper portions, while current waveforms are illustrated in lower portions.

As is apparent from both figures, due to effects of inductance of stator windings, a motor current becomes similar to a sine wave when a brushless D.C. motor in which permanent magnets are installed on the interior of a rotor, is employed, so that losses caused by higher harmonic currents are reduced and efficiency is improved. Further, torque ripple is reduced.

A brushless D.C. motor in which permanent magnets are installed on a surface of a rotor, and a brushless D.C. motor in which permanent magnets are installed interior of a rotor, are further described contradistinctionally in deteil.

The brushless D.C. motor in which permanent magnets are installed on a surface of a rotor, which motor is illustrated in FIG. 5, has cylindrical shaped silicon steel plates which constitute a rotor 3a. Therefore, inductance of stator windings are maintained to be constant regardless of rotational position of the rotor 3a. On the contrary, the brushless D.C. motor in which permanent magnets are installed on the interior of a rotor 3e, which motor is illustrated in FIG. 6, has silicon steel plates which are magnetic bodies, and nonmagnetic bodies 3g, which silicon steel plates and nonmagnetic bodies 3g are alternately disposed in a portion of the rotor 3e which portion is close to an outer periphery of the rotor 3e. Therefore, inductance of stator windings vary depending upon rotational position of the rotor 3e. Specifically, when the brushless D.C. motor in which permanent magnets are installed on the surface of the rotor, and the brushless D.C. motor in which permanent magnets are installed interior of the rotor, are operated in nominal conditions, both d-axis inductance and q-axis inductance of the former brushless D.C. motor are 3.2 mH, while d-axis inductance and q-axis inductance of the latter brushless D.C. motor are 7.7 mH, 22.8 mH, respectively.

A method for outputting inverter voltages which maximize a d-axis voltage (induced voltage of the motor), that is for outputting inverter voltages so that a phase of a motor current and a phase of the induced voltage of the motor are the same to one another, is generally employed as a driving and controlling method of a brushless D.C. motor, because magnetic flux of permanent magnets are intended to be available at its maximum. In FIGS. 11, a phase of inverter voltage is advanced by 29° with respect to a phase of induced voltage of a brushless D.C. motor in which permanent magnets are installed on a surface of a rotor. FIGS. 11 are obtained under a condition that a number of revolutions 2858 r.p.m., load torque is 20 kg·cm, a motor voltage is 114.0 V, and a motor current is 7.20 A. In FIGS. 11, scales are 200 V/div. for voltage, 10 A/div. for current, and 2 msec/div. for horizontal axis. Further, the advanced angle varies depending upon motor constants.

Figure 13:
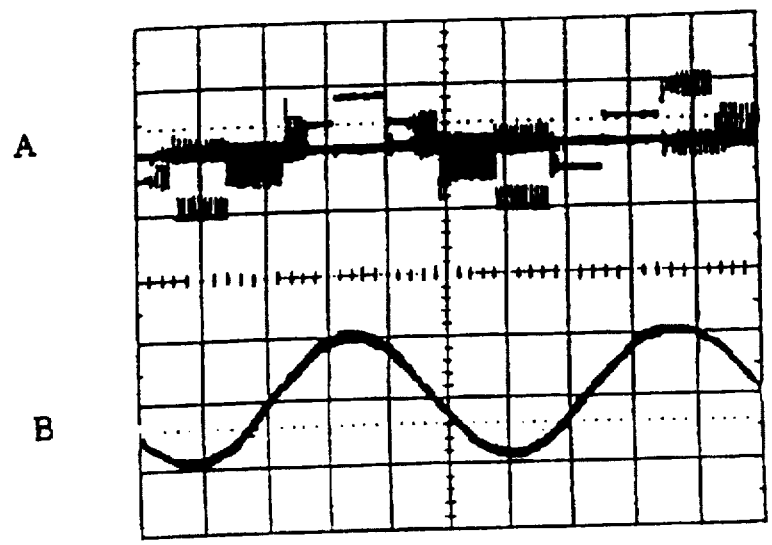
FIGS. 13 are diagrams illustrating a voltage waveform and a current waveform when a brushless D.C. motor in which permanent magnets are installed in the interior of a rotor, is supplied inverter output voltages which is advanced in phase from a phase which makes a phase of a brushless D.C. motor current and a phase of induced voltage of the brushless D.C. motor equal to one another.

But, a brushless D.C. motor in which permanent magnets are installed interior of a rotor, has inductance of stator windings which is slightly greater than that of the former brushless D.C. motor. Therefore, a current waveform becomes a waveform which is illustrated in FIGS. 12. FIGS. 12 are obtained under conditions that a number of revolutions is 2858 r.p.m., load torque is 20 kg·cm, a motor voltage is 126.5 V, and a motor current is 5.76 A. In FIGS. 12, scales are 200 V/div. for voltage, 10 A/div. for current, and 2 msec/div. for horizontal axis. A phase of inverter voltage is advanced by 70° with respect to a phase of an induced voltage of the motor in a case which is illustrated in FIG. 12. The advanced angle varies depending upon motor constants. When a phase of inverter voltage is further advanced with respect to the above phase of inverter voltage (advanced angle is 73°), and the inverter voltage is supplied to the brushless D.C. motor, a current waveform illustrated in lower portion of FIGS. 13 is obtained. FIGS. 13 are obtained under conditions that a number of revolutions is 2858 r.p.m., load torque is 20 kg·cm, a motor voltage is 89.6 V, and a motor current is 6.92 A. In FIGS. 13, scales are 200 V/div. for voltage, 10 A/div. for current, and 2 msec/div. for horizontal axis. A voltage waveform is illustrated in upper portion of FIGS. 13.

When FIGS. 12 and 13 are compared to one another, it is understood that the current waveform is quite similar to a sine wave due to the effect of q-axis inductance. Therefore, torque ripple reducing effect and efficiency improving effect are further improved. Further, "reluctance torque" and "field weakening effect" which are other characteristics of a brushless D.C. motor in which permanent magnets are installed interior of a rotor, are effectively utilized.

Figure 14:
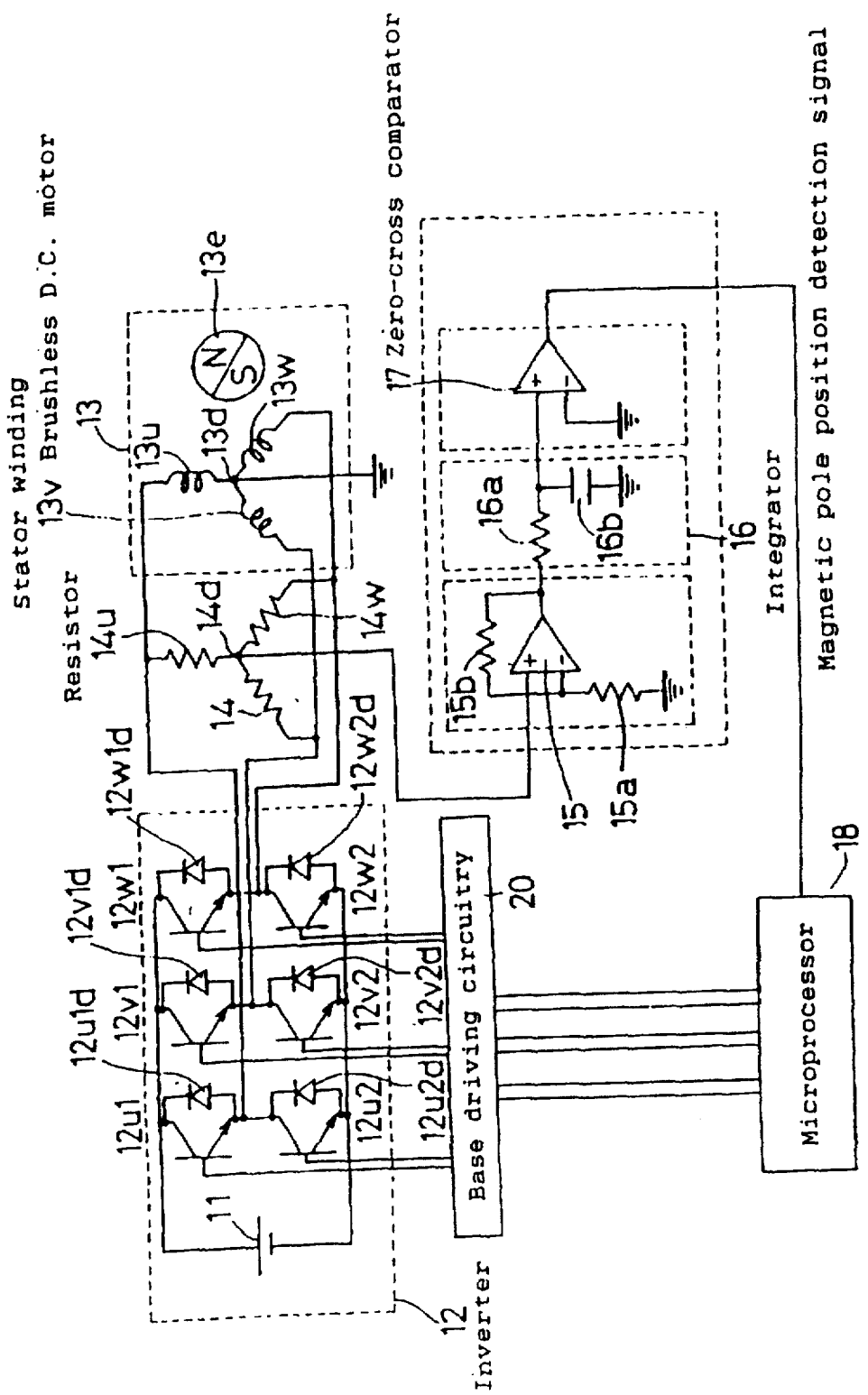
FIG. 14 is a diagram schematically illustrating a brushless D.C. motor driving and controlling apparatus which achieves a conducting interval of 180° by electrical angle.
Figure 15:
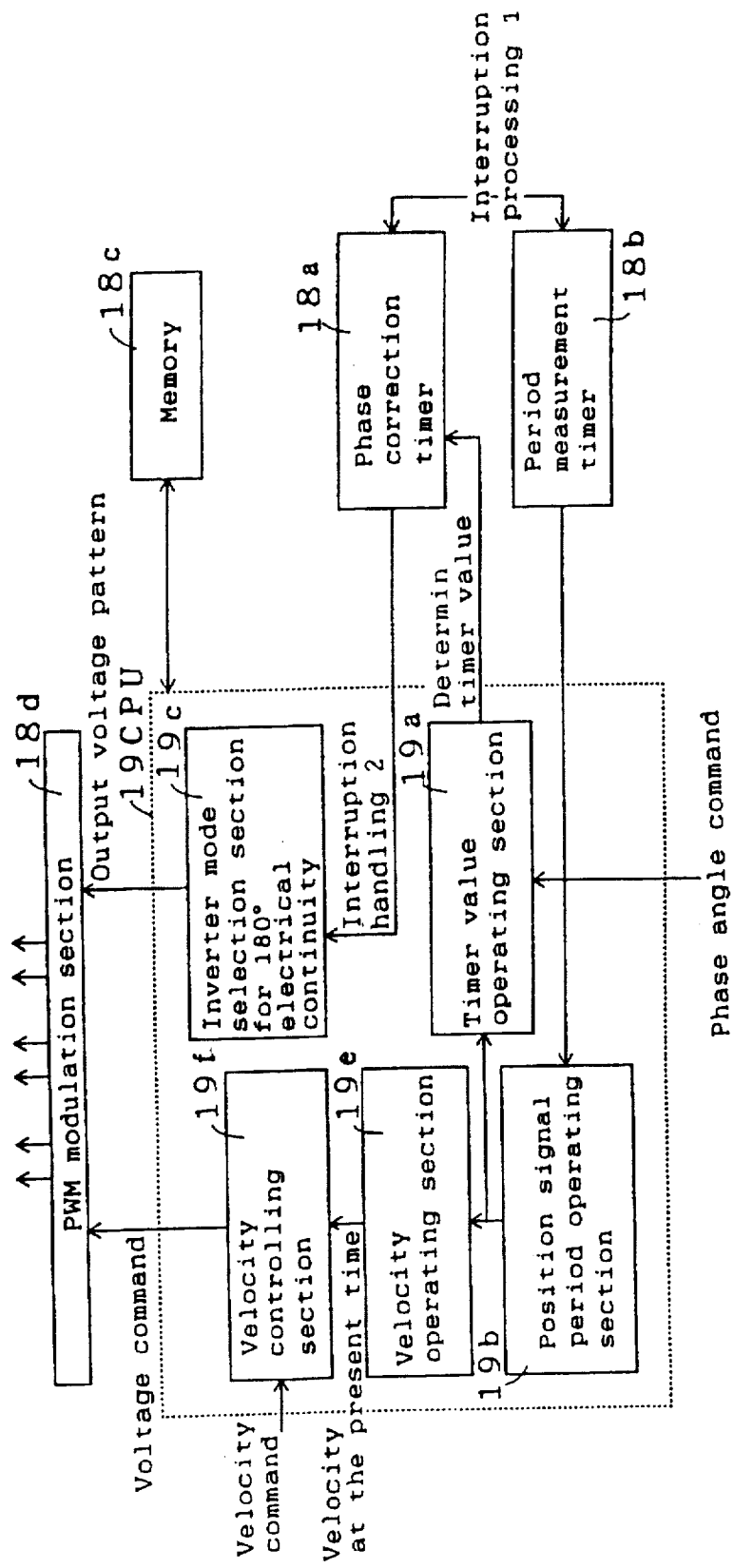
FIG. 15 is a diagram illustrating an inner arrangement of a microprocessor which is illustrated in FIG. 14.

FIG. 14 is a diagram schematically illustrating a brushless D.C. motor driving and controlling apparatus which achieves a conducting interval of 180° by electrical angle, while FIG. 15 is a diagram illustrating an inner arrangement of a microprocessor which is illustrated in FIG. 14. Three pairs of switching transistors 12u1, 12u2, 12v1, 12v2, 12w1, 12w2 are serially connected, respectively, between terminals of a d.c. power source 11 so that inverters 12 are constituted. A voltage at each connecting point of each pair of switching transistors is supplied to each of three stator windings 13u, 13v, 13w of a brushless D.C. motor 13, the stator windings 13u, 13v, 13w being Y-connected and each of the stator windings 13u, 13v, 13w corresponding to each phase. Also, a voltage at each connecting point of each pair of switching transistors is supplied to each of three resistors 14u, 14v, 14w which are Y-connected. Further, diodes 12u1d, 12u2d, 12v1d, 12v2d, 12w1d, 12w2d for protection are connected between collector-emitter terminals of the switching transistors 12u1, 12u2, 12v1, 12v2, 12w1, 12w2, respectively. Furthermore, 13e represents a rotor of the brushless D.C. motor 13. Suffixes of u, v, w correspond to u-phase, v-phase, w-phase of the brushless D.C. motor 13, respectively. A second voltage of a neutral point 13d of the Y-connected stator windings 13u, 13v, 13w is supplied to a reversed input terminal of an amplifier 15 through a resistor 15a. A first voltage of a neutral point 14d of the Y-connected resistors 14u, 14v, 14w is supplied as it is to a non-reversed input terminal of the amplifier 15. A resistor 15b is connected between an output terminal and the reversed input terminal of the amplifier 15 so that the amplifier 15 operates as an differential amplifier.

An output signal output from the outputed terminal of the amplifier 15 is supplied to an integrator 16 which is constituted by serially connecting a resistor 16a and a capacitor 16b.

An output signal from the integrator 16 (a voltage at a connecting point of the resistor 16a and the capacitor 16b) is supplied to a non-reversed input terminal of a zero-cross comparator 17 which is supplied the second voltage of the neutral point 13d to its reversed input terminal.

Therefore, a magnetic pole position detection signal is output from an output terminal of the zero-cross comparator 17. In other words, a position detector is constituted by the differential amplifier, integrator 16 and zero-cross comparator 17. A position detector which is constituted by a rotary encoder and the like may be employed instead of the position detector having the above arrangement.

Figure 1:
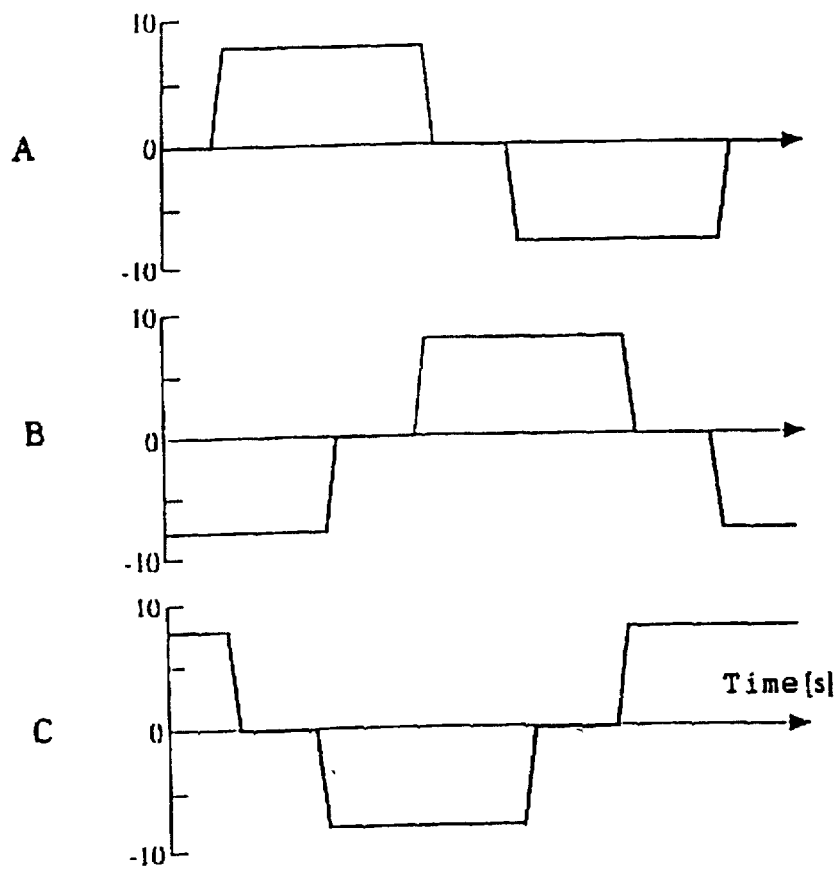
FIGS. 1 are diagrams illustrating ideal current waveforms and generated torque for a brushless D.C. motor driven by voltage-fed inverters with a conducting interval of 120° by electrical angle.
Figure 2:
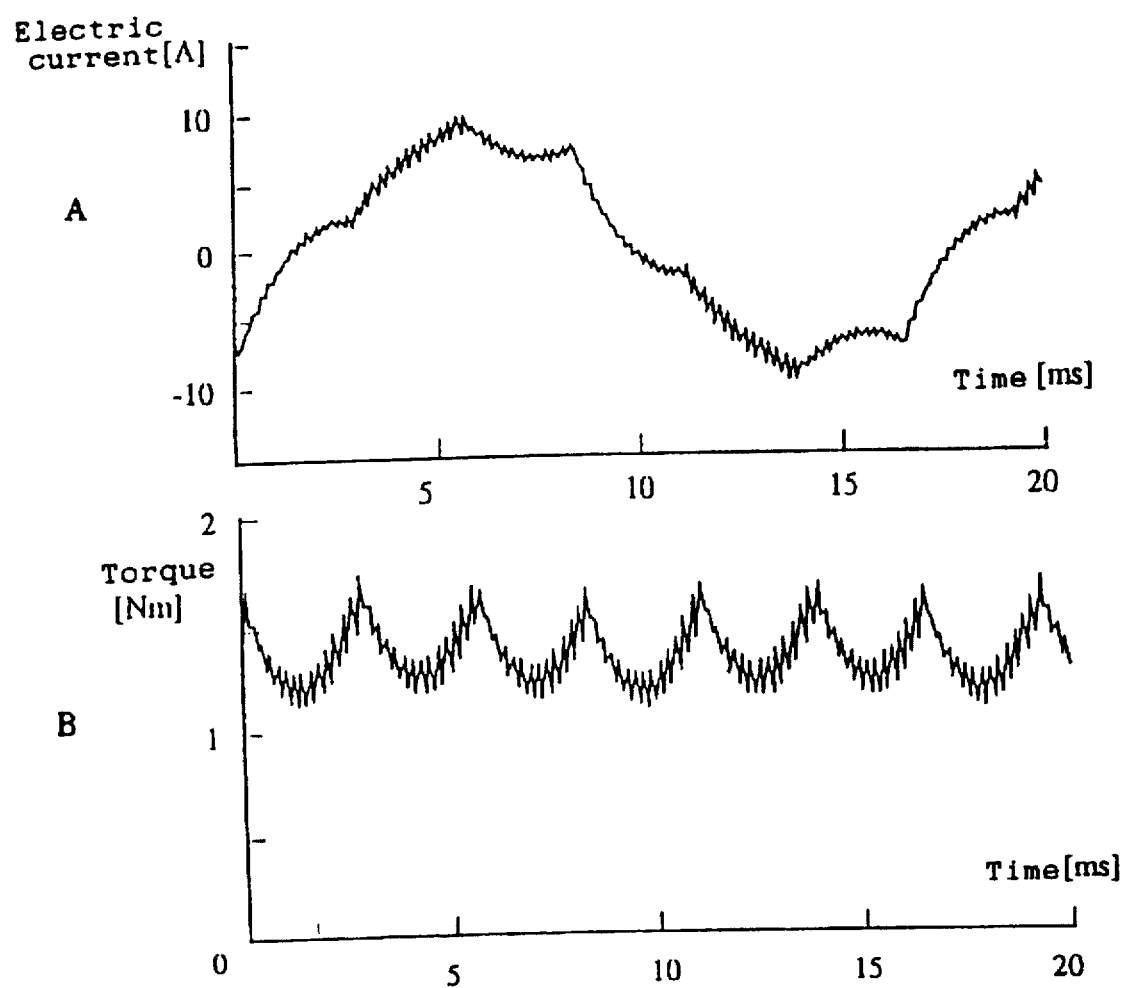
FIGS. 2 are diagrams illustrating simulation results of a current waveform and generated torque for a brushless D.C. motor driven by voltage-fed inverters with a conducting interval of 180° by electrical angle.
Figure 3:
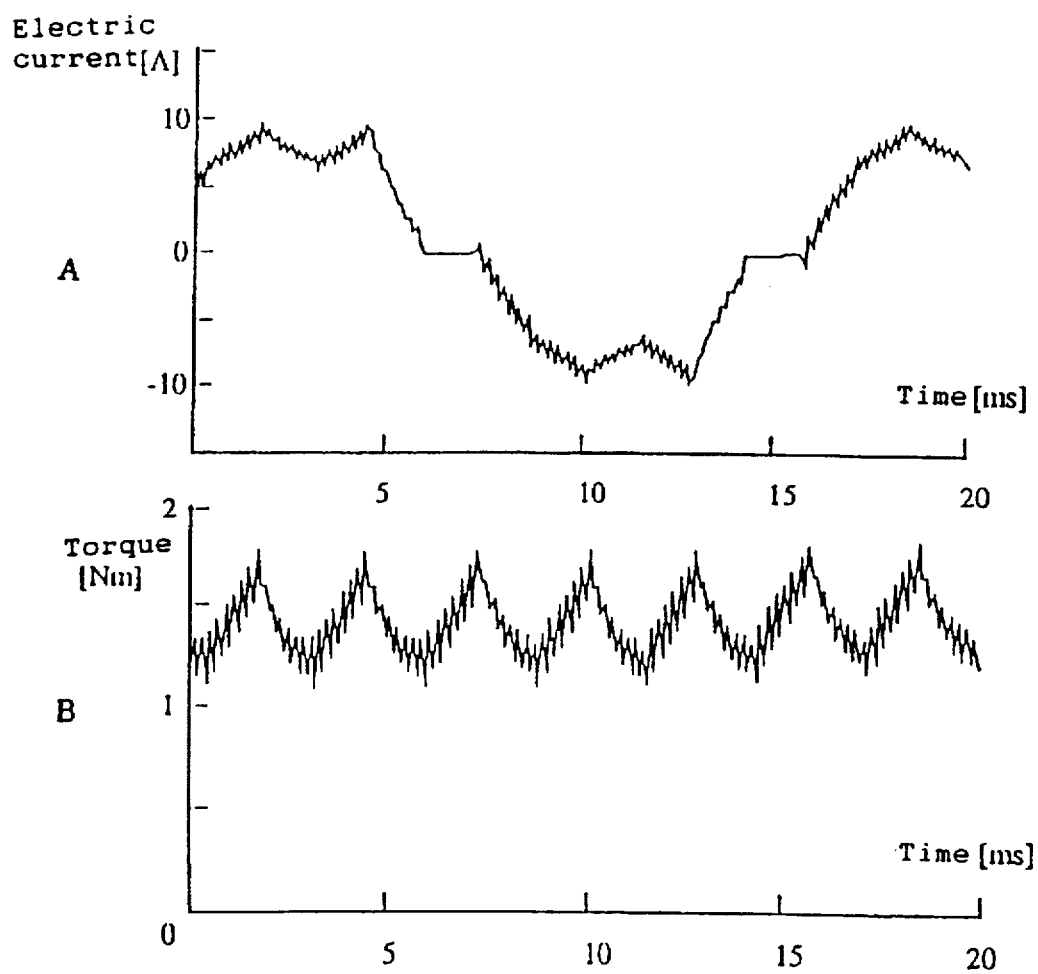
FIGS. 3 are diagrams illustrating a current waveform and generated torque for a brushless D.C. motor driven by voltage-fed inverters with a conducting interval of 120° by electrical angle.

The magnetic pole position detection signal output from the position detector is supplied to an external interruption terminal of a microprocessor 18. In the microprocessor 18, an interrupt handling (refer to interrupt handling 1 in FIG. 15) for a phase correction timer 18a and a period measurement timer 18b, is carried out based upon the magnetic pole position detection signal which is supplied to the external interruption terminal. The phase correction timer 18a determines its timer value by a timer value operating section 19a which is described later. The period measurement timer 18b supplies its timer value to a position signal period operating section 19b which is included in a CPU 19. The position signal period operating section 19b calculates a timer value per 1 cycle by electrical angle based upon a timer value corresponding to 60° by electrical angle, for example. The phase correction timer 18a supplies a count - - - over signal to inverter mode selection section 19c for a conducting interval of 180° by electrical angle so that an interrupt handling (refer to an interrupt handling 2 in FIG. 2) is carried out. The inverter mode selection section 19c for a conducting interval of 180° by electrical angle, reads out corresponding voltage pattern from a memory 18c and outputs therefrom. In the CPU 19, the position signal period operating section 19b performs operations based upon the timer value and outputs a position signal period signal which is supplied to a timer value operating section 19a and a velocity operating section 19e. The timer value operating section 19a is also supplied a phase angle command. The timer value operating section 19a calculates timer value which is determined in the phase correction timer 18a, based upon the phase angle command and the position signal period signal from the position signal period operating section 19b. The velocity operating section 19e calculates a velocity at the present time based upon the position signal period signal from the position signal period operating section 19b, and supplies the calculated velocity to a velocity controlling section 19f. The velocity controlling section 19f is also supplied a velocity command. The velocity controlling section 19f outputs a voltage command based upon the velocity command and the velocity at the present time from the velocity operating section 19e. And, the voltage pattern output from the inverter mode selection section 19c for a conducting interval of 180° by electrical angle, and the voltage command output from the velocity controlling section 19f are supplied to a PWM (Pulse Width Modulation) modulation section 18d. The PWM modulation section 18d outputs PWM modulation signals for three phases. The PWM modulation signals are supplied to a base driving circuitry 20. The base driving circuitry 20 outputs control signals for supplying base terminals of the switching transistors 12u1, 12u2, 12v1, 12v2, 12w1, 12w2. Each section included in the CPU 19 represents a functional portion for performing a corresponding function. These sections do not exist in the CPU 19 in a recognizable condition.

The Voltage patterns corresponding to inverter modes are represented in table 1. The voltage patterns are represented with ON-OFF conditions of the switching transistors 12u1, 12u2, 12v1, 12v2, 12w1, 12w2. "1" corresponds to ON condition, while "0" corresponds to OFF condition.

TABLE 1

| Inverter mode | Voltage-Fed inverters | | | | | |
|---|---|---|---|---|---|---|
| | 12u1 | 12u2 | 12v1 | 12v2 | 12w1 | 12w2 |
| 0 | 1 | 0 | 0 | 1 | 1 | 0 |
| 1 | 1 | 0 | 0 | 1 | 0 | 1 |
| 2 | 1 | 0 | 1 | 0 | 0 | 1 |
| 3 | 0 | 1 | 1 | 0 | 0 | 1 |
| 4 | 0 | 1 | 1 | 0 | 1 | 0 |
| 5 | 0 | 1 | 0 | 1 | 1 | 0 |

Figure 18:
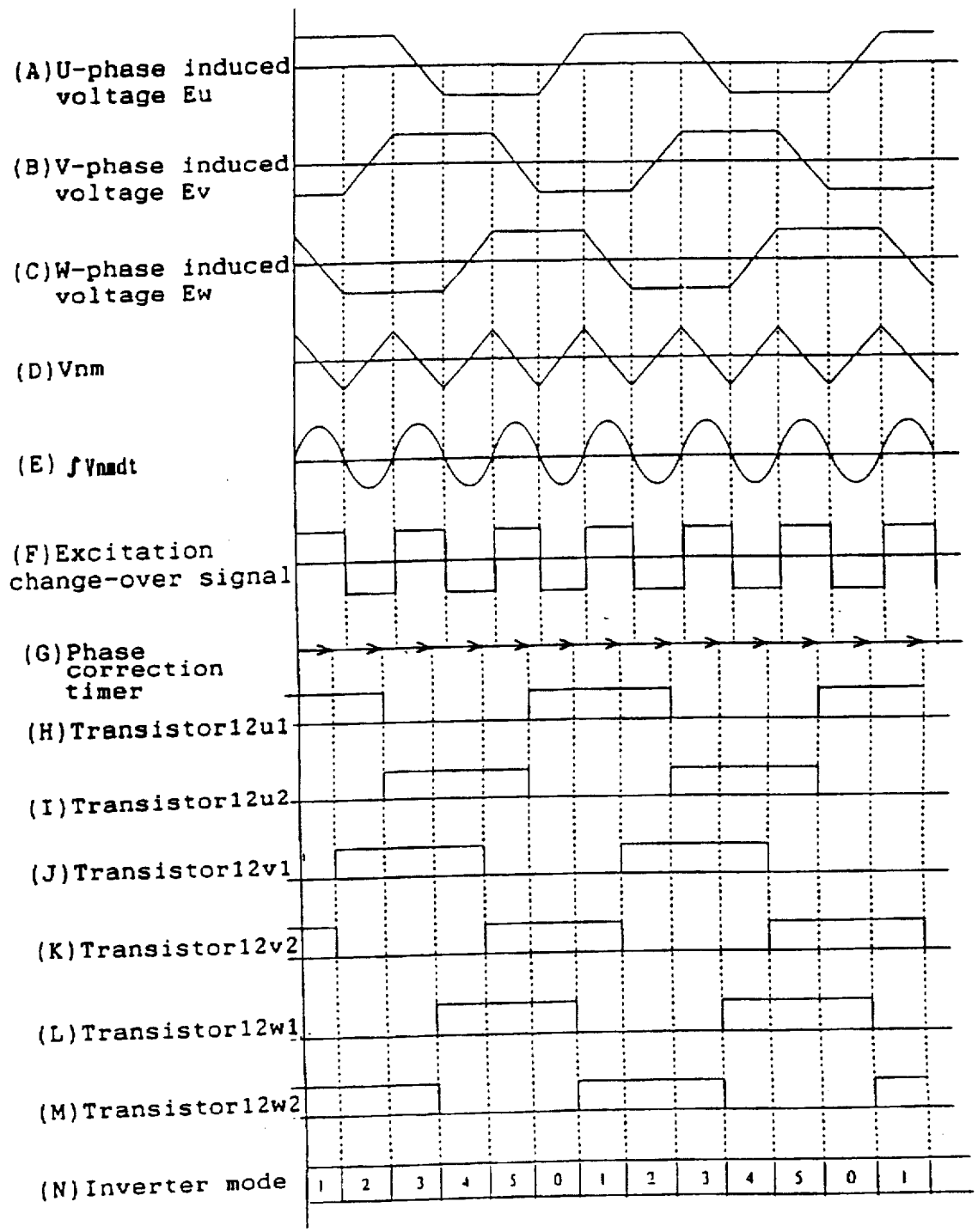
FIGS. 18 are diagrams illustrating signal waveforms and processing contents of each section of the brushless D.C. motor driving and controlling apparatus which is illustrated in FIG. 14.

Next, referring to waveform diagrams illustrated in FIGS. 18, operation of the brushless D.C. motor driving and controlling apparatus which is illustrated in FIG. 14, is described.

The u-phase, v-phase and w-phase induced voltages Eu, Ev, Ew of the brushless D.C. motor vary under a condition that three induced voltages are sequentially shifting their phase by 120°, as is illustrated in FIGS. 18(A), 18(B) and 18(C). The signal Vnm output from the amplifier 15 varies, as is illustrated in FIG. 18(D). An integration waveform (formula (1)) which is obtained by performing integration of the signal Vnm by the integrator 16, varies, as is illustrated in FIG. 18(E).

$$\int V_{nmd}\, t \qquad (1)$$

The integration waveform is supplied to the zero-cross comparator 17, and the zero-cross comparator 17 outputs a exitation change-over signal which rises or falls at zero-cross points of the integration signal, as is illustrated in FIG. 18(F). The interrupt handling 1 is performed due to the rising and falling of the excitation change-over signal so that the phase correction timer 18a starts {refer to start points of arrows illustrated in FIG. 18(G)}. The phase correction timer 18a performs time counting operation for the determined timer value and count-over is generated {refer to end points of arrows illustrated in FIG. 18(G)}, because the phase correction timer 18a is determined its timer value by the timer value operating section 19b. The interrupt handling 2 is carried out at every generation of count-over of the phase correction timer 18a, and the inverter mode selection section 19c for a conducting interval of 180° by electrical angle, advances the inverter mode by 1 step. That is, the inverter mode is selected in the order of "1", "2", "3", "4", "5", "0", "1", "2", . . . . . as is illustrated in FIG. 18(N). The inverter mode is advanced by 1 step due to the count-over of the phase correction timer 18a, so that the switching transistors 12u1, 12u2, 12v1, 12v2, 12w1, 12w2 ON-OFF conditions are controlled in correspondence to each inverter mode, as are illustrated in FIGS. 18(H) through 18(M). As a result, driving of the brushless D.C. motor 13 is performed under a condition that the conducting term is determined to be 180° by electrical angle, and the phase of the inverter voltage is determined to be an advanced phase with respect to the induced voltage of the motor. Wherein, an advancing angle of the phase of the inverter voltage is controlled by the phase correction timer 18a.

Figure 16:
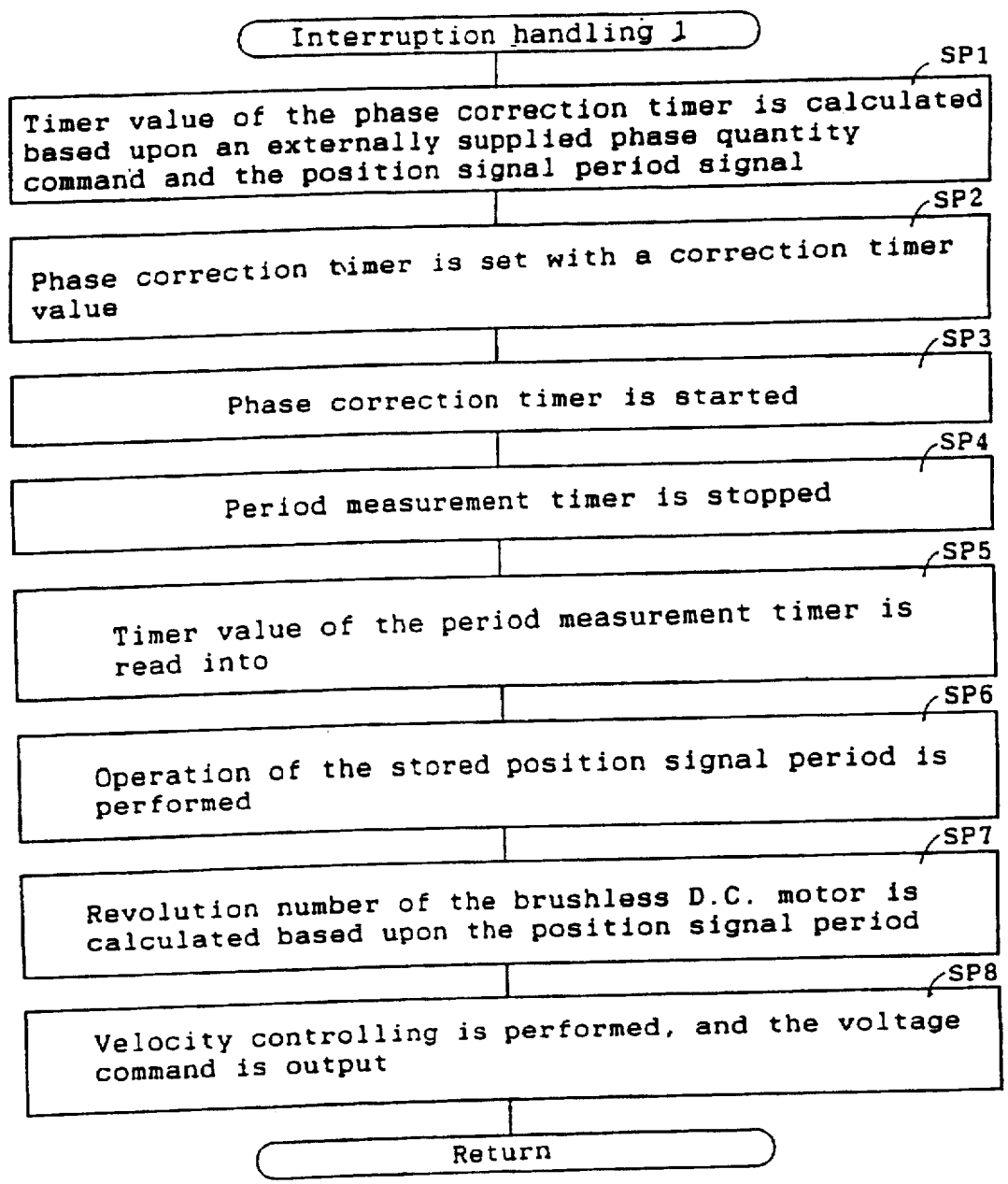
FIG. 16 is a flowchart which explains processing contents of an interrupt handling 1 in detail.

FIG. 16 is a flowchart which explains the processing of the interrupt handling 1 in detail. An external interruption request is accepted at a rising edge and falling edge, respectively, of a magnetic pole position detection signal (which signal corresponds to the exitation change-over signal) of the position detector. In step SP1, a timer value of the phase correction timer 18a is calculated based upon an externally supplied phase angle (phase correction angle) command and the position signal period signal obtained by the position signal period operating section 19b. In step SP2, the phase correction timer 18a is set with a correction timer value (timer value for correction). In step SP3, the phase correction timer 18a is started. In step SP4, the period measurement timer 18b is stopped which was started in the previous interrupt handling 1. In step SP5, the timer value of the period measurement timer 18b is stored. These processings in steps SP4 and SP5 are processings for detecting a period of an edge of the exitation change-over signal. Therefore, the period measurement timer 18b is reset and started immediately after the reading of the timer value of the period measurement timer 18b, for the next period measurement. In step SP6, an operation of the stored position signal period (for example, calculation of a counting number per 1° by electrical angle). In step SP7, the revolution number at the present time of the brushless D.C. motor 13 is calculated based upon the position signal period operation result. In step SP8, velocity controlling is performed following the externally supplied velocity command, and the voltage command is output. Thereafter, processing is returned to prior processing.

Specifically, when the count value corresponding to the interval of the magnetic pole position detection signal is 360, obtained by actual measurement by the period measurement timer 18b, the count value per 1 period of the inverter output voltage becomes 360×6=2160 because a number of inverter modes is 6. And, the count value for 1° becomes 2160/360=6 because the count value of 2160 corresponds to 360°. When the phase angle command is 60°, the count value (timer value) corresponding to the phase angle command becomes 6×60=360. Therefore, the value of 360 is set in the phase correction timer 18a as the timer value for correction, and the phase correction timer 18a is started.

Figure 17:
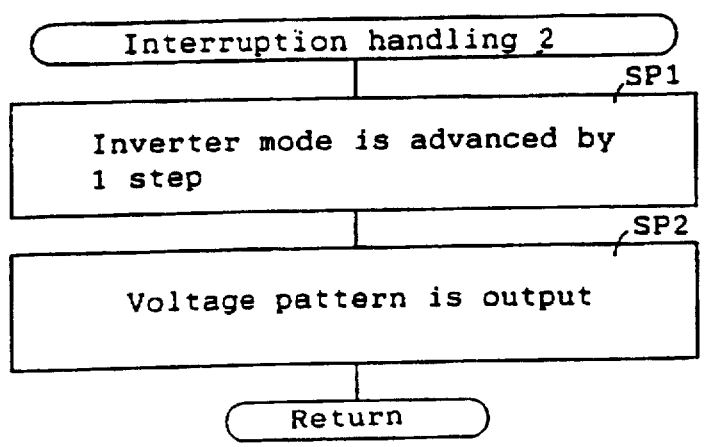
FIG. 17 is a flowchart which explains processing contents of an interrupt handling 2 in detail.

FIG. 17 is a flowchart which explains contents processing of the interrupt handling 2 in detail. The interrupt handling 2 is accepted when the phase correction timer 18a started in the interrupt handling 1, becomes count-over condition. In step SP1, the inverter mode, previously determined in the memory 18c, is advanced by 1 step which inverter mode is. In step SP2, the voltage pattern corresponding to the advanced inverter mode is output. Thereafter, processing is returned to prior processing.

Therefore, a number of timers is decreased by 1 and interrupt handlings are decreased by 1 when the above controlling is realized using a microcomputer, which advantages will be apparent by comparing the above embodiment to a comparative example which is described below. Further, when the above contolling is realized using hardware, a number of counters is decreased by 1.

COMPARATIVE EXAMPLE

Figure 19:
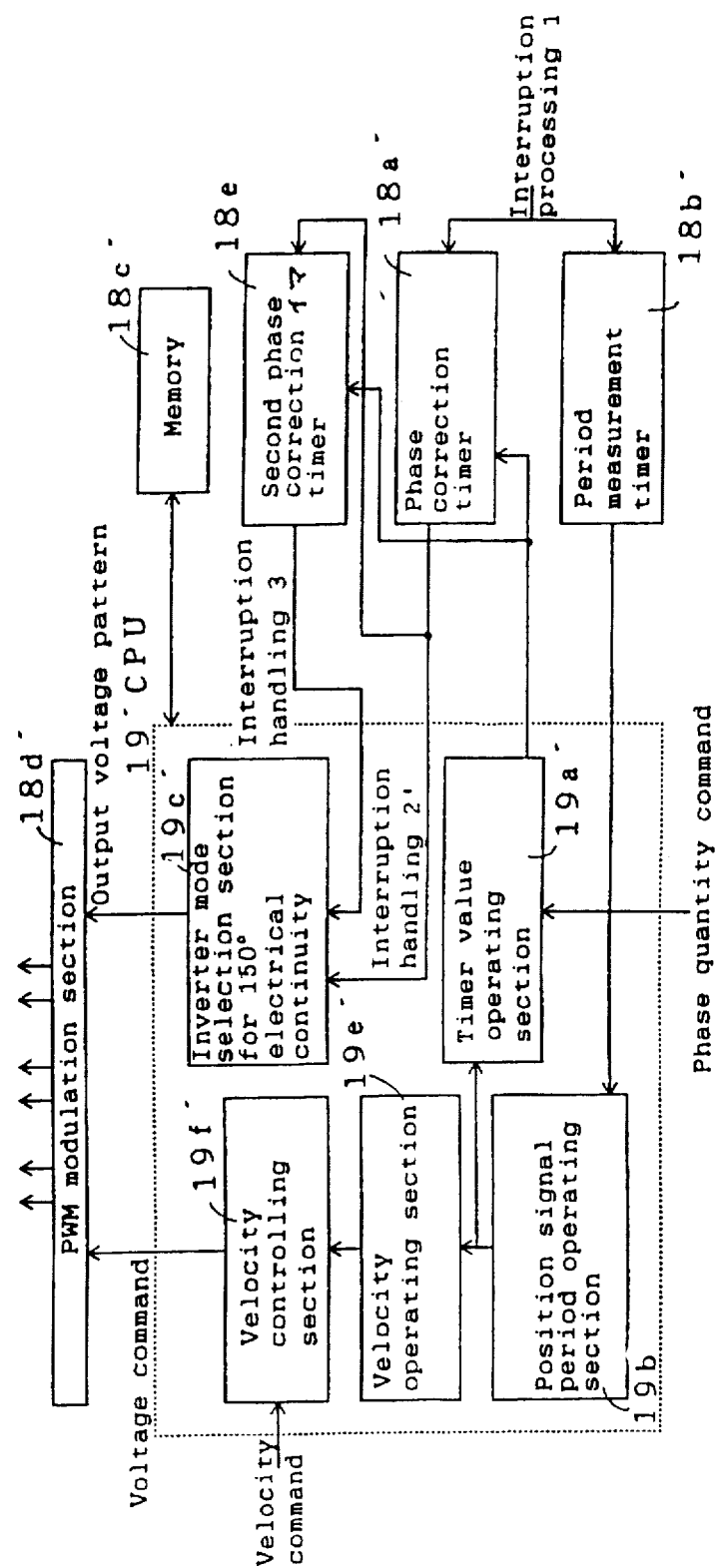
FIG. 19 is a block diagram illustrating an inner arrangement of a microprocessor which is incorporated in a brushless D.C. motor driving and controlling apparatus which achieves a conducting interval of 150° by electrical angle.

FIG. 19 is a diagram illustrating an inner arrangement of the microprocessor 18 which is incorporated in a brushless D.C. motor driving and controlling apparatus for realizing a conducting interval of 150° by electrical angle. The microprocessor 18 realizes the conducting interval of 150° by electrical angle. The inner arrangement differs from the inner arrangement which is illustrated in FIG. 15 in that an inverter mode selection section 19c' for a conducting interval of 150° by electrical angle, is employed instead of the inverter mode selection section 19c for a conducting interval of 180° by electrical angle, a second phase correction timer 18e is further provided, and contents of the interrupt handling 2' and a number of inverter modes are increased. The second phase correction timer 18e is started in the interrupt handling 2' which is caused by the phase correction timer 18a', and supplies its count-over signal to the inverter mode selection section 19c', included in the CPU 19' for a conducting interval of 150° by electrical angle so that an interrupt handling (refer to the interrupt handling 3 in FIG. 19) is carried out. In this comparative example, component sections corresponding to the component sections illustrated in FIG. 15, have reference numerals with "'" added. Further, arrangements and interconnections of the inverter circuitry, brushless D.C. motor, Y-connected resistors, position detector, base driving circuitry are the same to the arrangements and interconnections illustrated in FIG. 14, therefore illustration and description are omitted.

The second phase correction timer 18e determines its timer value by the timer value operating section 19a'.

Voltage patterns corresponding to inverter modes are represented in table 2. The voltage patterns are represented with ON-OFF conditions of the switching transistors 12u1, 12u2, 12v1, 12v2, 12w, 12w2. And, "1" corresponds to ON condition, while "0" corresponds to OFF condition.

TABLE 2

| Inverter mode | Voltage-Fed inverters | | | | | |
|---|---|---|---|---|---|---|
| | 12u1 | 12u2 | 12v1 | 12v2 | 12w1 | 12w2 |
| 0 | 1 | 0 | 0 | 1 | 1 | 0 |
| 1 | 1 | 0 | 0 | 1 | 0 | 0 |
| 2 | 1 | 0 | 0 | 1 | 0 | 1 |
| 3 | 1 | 0 | 0 | 0 | 0 | 1 |
| 4 | 1 | 0 | 1 | 0 | 0 | 1 |
| 5 | 0 | 0 | 1 | 0 | 0 | 1 |
| 6 | 0 | 1 | 1 | 0 | 0 | 1 |
| 7 | 0 | 1 | 1 | 0 | 0 | 0 |
| 8 | 0 | 1 | 1 | 0 | 1 | 0 |
| 9 | 0 | 1 | 0 | 0 | 1 | 0 |
| 10 | 0 | 1 | 0 | 1 | 1 | 0 |
| 11 | 0 | 0 | 0 | 1 | 1 | 0 |

Figure 22:
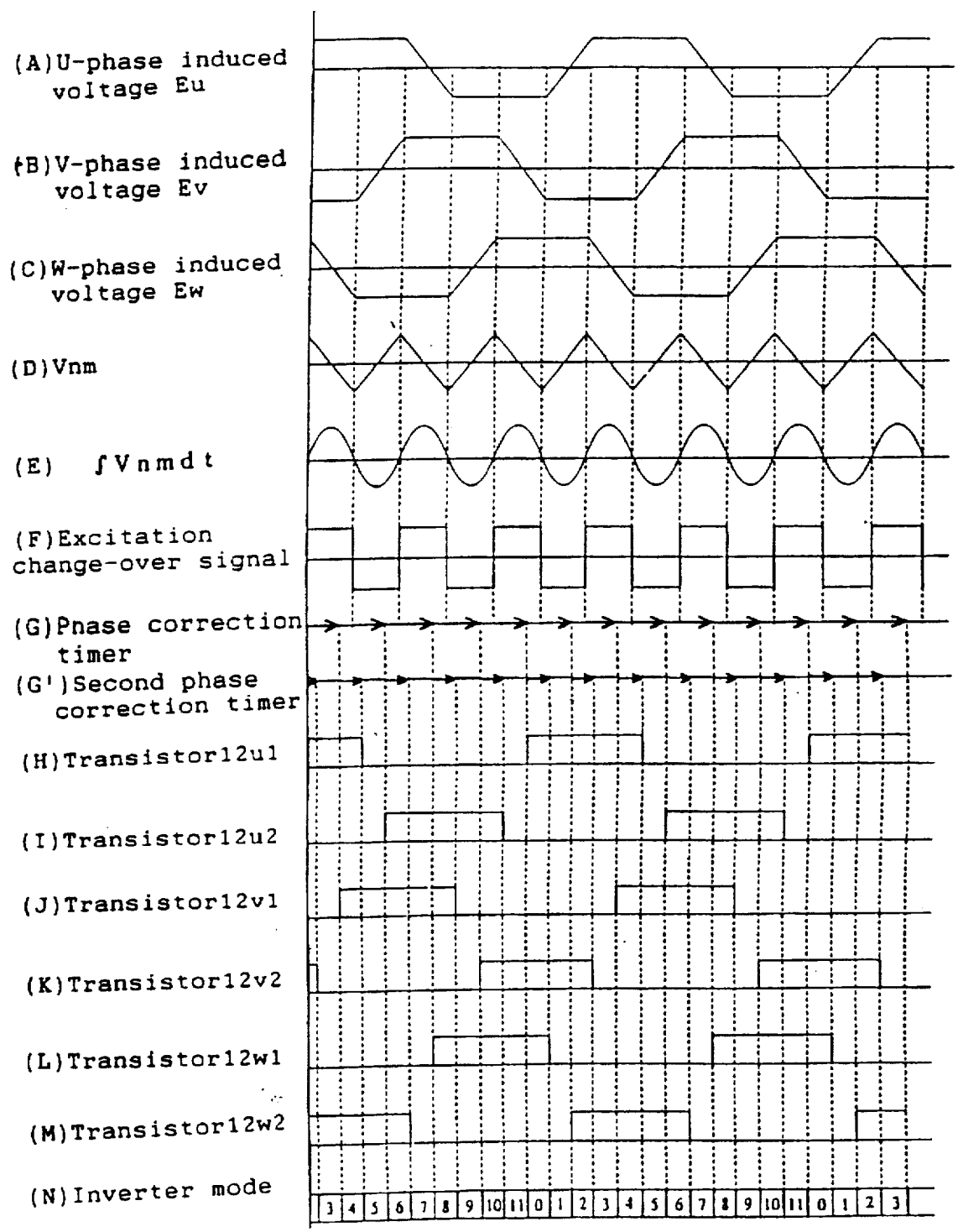
FIGS. 22 are diagrams illustrating signal waveforms and processing contents of each section of the brushless D.C. motor driving and controlling apparatus which is illustrated in FIG. 19.

FIGS. 22 are waveform diagrams of component sections. There waveforms represent the operation of this comparative example. Waveforms illustrated in FIGS. 22(A) through 22(G) are the same to those of FIGS. 18(A) through 18(G). And, voltage patterns corresponding to inverter modes which correspond to even numbers, are outputed by the interrupt handling 2' and voltage patterns corresponding to inverter modes which correspond to odd numbers, are outputed by the interrupt handling 3, due to the addition of FIG. 22(G'), so that driving of a brushless D.C. motor under a condition that the conducting term is determined to be 150° by electrical angle, is performed.

Figure 20:
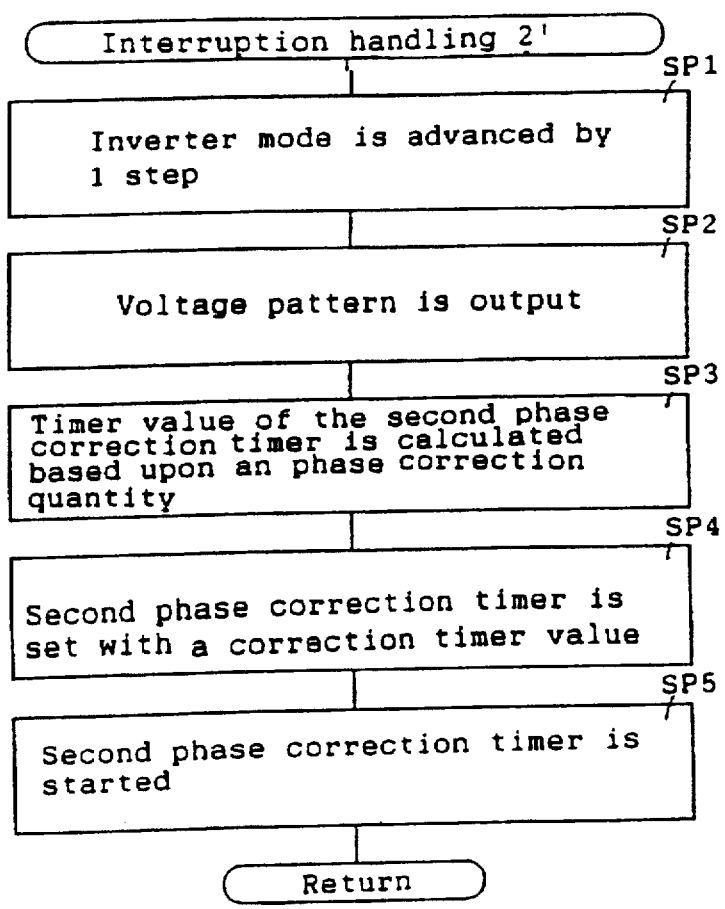
FIG. 20 is a flowchart which explains processing contents of an interrupt handling 2' in detail.

FIG. 20 is a flowchart which explains contents of processing of the interrupt handling 2' in detail. The interrupt handling 2' is accepted when the phase correction timer 18a', started in the interrupt handling 1', becomes count-over condition. In step SP1, an inverter mode is advanced by 1 step, this inverter mode previously determined in the memory 18c'. In step SP2, a voltage pattern corresponding to the advanced inverter mode is outputed. In step SP3, a timer value (a value corresponding to 30°) for the second phase correction timer 18e is calculated based upon the phase correction value. In step SP4, the timer value for correction is set to the second phase correction timer 18e. In step SP5, the second phase correction timer 18e is started. Thereafter, processing is returned to prior processing.

Figure 21:
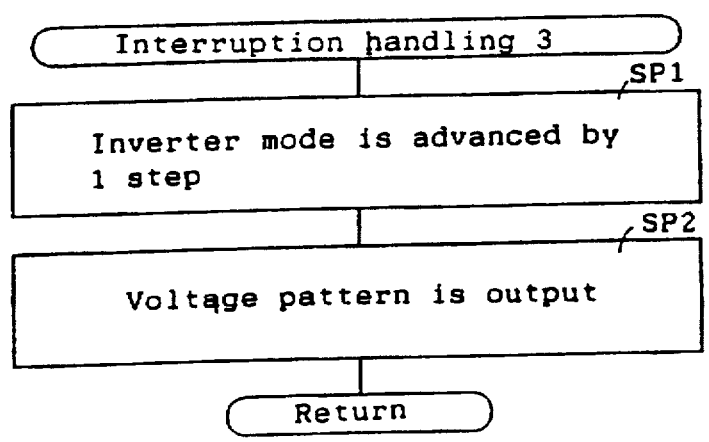
FIG. 21 is a flowchart which explains processing contents of an interrupt handling 3 in detail.

FIG. 21 is a flowchart which explains contents of processing of the interrupt handling 3 in detail. The interrupt handling 3 is accepted when the second phase correction timer 18e started in the interrupt handling 2', becomes count-over condition. In step SP1, an inverter mode is advanced by 1 step, which inverter mode is previously determined in the memory 18c'. In step SP2, a voltage pattern corresponding to the advanced inverter mode is output. Thereafter, processing is returned to prior processing.

The magnetic pole position detection by the amplifier 15, integrator 16 and zero-cross comparator 17 which are illustrated in FIG. 14, is described in more detail.

In magnetic pole position detection which is achieved by detecting motor voltages, a magnetic pole position detection method is employed in electric equipment such as an air conditioner or the like. This method uses induced voltages which appear in both upper and lower arms' OFF term of the conducting interval of 120° by electrical angle. The method becomes impossible to detect the induced voltages when high load is employed and currents are increased so that the magnetic pole position detection is impossible to achieve.

When it is assumed that the time period until the current flowing in stator windings is cut off, is t, conducting angle of inverters in the term of 180° by electrical angle is determined to be α (rad), and output frequency is f, a condition formula for determining possibility and impossibility of induced voltage detection, is as follows.

$$t<(\pi-\alpha)/(4\pi f)$$

As is apparent from the condition formula, it is understood that detection of induced voltage is principally impossible when a conducting interval of 180° by electrical angle is employed. When a greater torque is required, an amplitude of a current should be increased. When an amplitude of a current is increased, a residual current due to motor inductance becomes greater. In the worst case, a current flowing in a stator winding is not cut off during a 180° term (a term corresponding to 180° by electrical angle). Therefore, an amplitude of a current should be limited so that a current flowing in a stator winding is securely cut off during the 180° term. Consequently, an amplitude of a current cannot be increased too much when high speed revolution is performed and/or when conducting period is lengthened.

When the arrangement illustrated in FIG. 14 is employed, the voltage $E_{N\text{-}0}$ at the neutral point 13d of the Y-connected stator windings 13u, 13v, 13w becomes the following equation:

$$E_{N\text{-}0}=(1/3)\{(V_{u\text{-}0}-E_{u\text{-}0})+(V_{v\text{-}0}-E_{v\text{-}0})+(V_{w\text{-}0}-E_{w\text{-}0})\}$$

Figure 23:
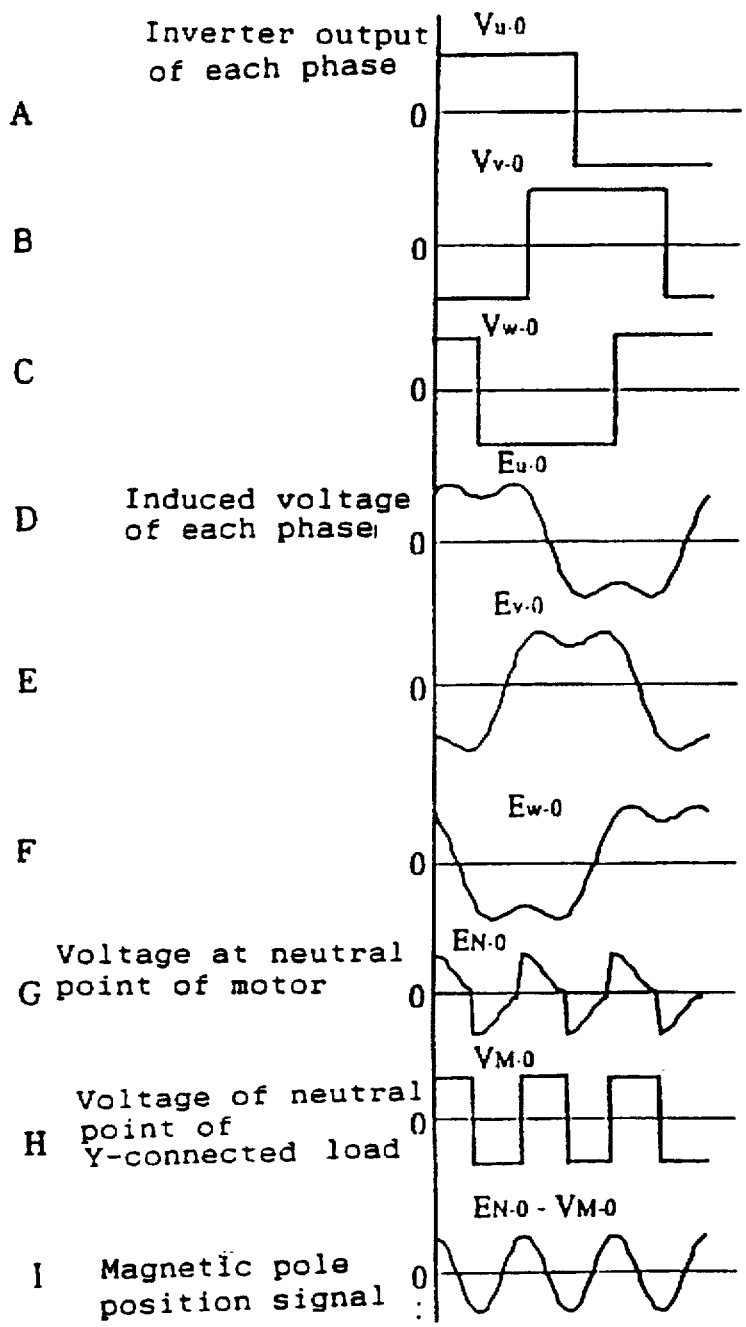
FIGS. 23 are diagrams illustrating signal waveforms of each section of the brushless D.C. motor driving and controlling apparatus which is illustrated in FIG. 14, which diagrams are useful in understanding position detection operation by an amplifier, integrator and zero-cross comparator.

In other words, the voltage $E_{N\text{-}0}$ becomes a sum {refer to FIG. 23(G)} of 3n order higher harmonic components (wherein, n is an integer) which are included in the inverter output waveforms {refer to FIGS. 23(A), 23(B) and 23(C)} and the induced voltage waveforms {refer to FIGS. 23(D), 23(E) and 23(F)} of a motor.

Further, the voltage $V_{M\text{-}0}$ at the neutral point 14d of the Y-connected resistors 14u, 14v, 14w becomes the following equation (refer to FIG. 23(H)}:

$$V_{M\text{-}0}=(1/3)(V_{u\text{-}0}+V_{v\text{-}0}+V_{w\text{-}0})$$

Therefore, the 3n order higher harmonic component is taken out by obtaining a difference $E_{N\text{-}0}-V_{M\text{-}0}$ {refer to FIG. 23(I)} between both voltage s $E_{N\text{-}0}$, $V_{M\text{-}0}$. The arrangement illustrated in FIG. 14 is not limited by the condition formula and is applicable to conducting term having an arbitrary angle, because both equations are independent of a current. That is, magnetic pole position detection is achieved without using a magnetic pole position sensor especially when high speed revolution is performed and/or when conducting period is lengthened and when an amplitude of a current is increased. Also, magnetic pole position detection is achieved without using a magnetic pole position sensor especially when a conducting interval of 180° by electrical angle is employed.

In the foregoing, driving and controlling of a brushless D.C. motor is described under only a condition that the brushless D.C. motor is under steady operation. But, the above driving and controlling cannot be achieved when the brushless D.C. motor is stopped, because no induced voltages are generated. Therefore, when driving of the brushless D.C. motor is started, three-phase alternating voltage is externally and forcibly supplied to the brushless D.C. motor so that the rotor is rotated by synchronized operation. When the rotor begins its revolution, an induced volatge is generated so that the above driving and controlling of the brushless D.C. motor is achieved.

Further, when the conducting interval of 180° by electrical angle is employed, and when a brushless D.C. motor, in which permanent magnets are installed interior of a rotor and in which the motor has a special application, is driven under a condition of high revolution and great load, the motor current and the integration signal of the position detector are varied as are illustrated in FIGS. 24(A) and 24(B). It is understood that the integration signal is greatly disorder when the conducting interval of 180° by electrical angle is employed, by comparing the motor current and the integration signal to the motor current and the integration signal {refer to FIGS. 25(A) and 25(B)} which are obtained when the conducting interval of 120° by electrical angle is employed. Of course, a difference signal between voltages is disorder. Therefore, when a slight varying in load, resonance and the like in the driving system of the inverters and the brushless D.C. motor are generated, a point appears at which the integration signal is not zero-crossed due to the disorder so that the position signal is not obtained and the brushless D.C. motor may step out. The motor current illustrated in FIG. 24(A) is different from the current waveforms illustrated in in FIGS. 2(A), 12(B) and 13(B). The difference is caused by difference in motor application. Provided that such disadvantage are rarely generated.

To dissolve such disadvantage which is generated under a special condition, so that reliability of the apparatus for driving and controlling the brushless D.C. motor is improved, the conducting interval should be determined to be more than 120° and less than 180° by electrical angle. FIGS. 26 through 30 illustrate motor currents and integration signals which correspond to cases that the conducting interval is determined to be 130°, 140°, 150°, 160°, and 170° by electrical angle, respectively. As is apparent from those figures, disorder in integration signals are eliminated. Further, operating ranges of a compressor (a compressor which employs a brushless D.C. motor as a driving source), and motor efficiencies of the brushless D.C. motor are illustrated in FIGS. 31 and 32 which correspond to cases that the conducting interval is determined to be 130°, 140°, 150°, and 180° by electrical angle, respectively, and that the input currents are determined to be the same to one another. As is apparent from FIG. 31, the operating ranges scarcely vary when the conducting interval is determined to be 140°–170° by electrical angle. Also, as is apparent from FIG. 32, lowering in the motor efficiency is less than 1% when the conducting interval is determined to be 140°–170° by electrical angle. Therefore, it is preferable that the conducting interval is determined to be 140°–170° by electrical angle. In this case, the above disadvantage is securely prevented from occurrence by scarcely reducing the operating range. The results in only scarcely lowering the motor efficiency, so that the reliability is remarkably improved.

Further, an arrangement may be employed instead of the position detection circuitry which includes the amplifier 15, integrator 16 and zero-cross comparator 17. The arrangement is illustrated in FIG. 33(A), and has an amplifier 115 which is supplied the voltage at the neutral point 13d (refer to FIG. 14) to a non-reversed input terminal through a resistor 115a, and is supplied the voltage at the neutral point 14d (refer to FIG. 14) to a reversed input terminal. And, a resistor 115b and a capacitor 116b are connected in parallel between an output terminal and the reversed input terminal of the amplifier 115. Furthermore, an arrangement which is illustrated in FIG. 33(B) may be employed. The arrangement is obtained by adding an amplifier 117 to the arrangement illustrated in FIG. 33(A). The which amplifier 117 has a resistor which is connected between an output terminal and a reversed input terminal. In this arrangement, an output signal from the amplifier 115 is supplied to the reversed input terminal of the amplifier 117 through a resistor. Further, an arrangement which is illustrated in FIG. 33(C) may be employed. The arrangement is obtained by switching the amplifiers 115 and 117, as they appear in FIG. 33(B), with one another. When the arrangement illustrated in FIG. 33(C) is employed, the voltage at the neutral point 13d may be supplied to the reversed input terminal of the amplifier 117 through a resistor and the voltage at a neutral point 14d may directly be supplied to a non-reversed input terminal of the amplifier 117. When one of those arrangements is employed, operation which is similar to that of a corresponding portion which is illustrated in FIG. 14 is achieved.

Further, reducing in power consumption is required for an electrical equipment such as air conditioner, vacuum cleaner, electrical washer and the like, and a brushless D.C. motor and an inverter which have drawn attention in recent years, are going to be employed. When the apparatus for driving and controlling a brushless D.C. motor according to the present invention is applied to those electrical equipments, power consumption is further reduced in comparison to conventional electrical equipments which employ a brushless D.C. motor and inverters.

Possibility in Industrial Utilization

The present invention performs improvement in efficiency and enlargement in operating range of a brushless D.C. motor which is employed as a driving source in various applications.

What is claimed is:

1. A brushless D.C. motor driving and controlling method for driving a brushless D.C. motor using voltage-fed inverters, said method comprising the steps:
   setting a conducting interval of said voltage-fed inverters to a predetermined interval which is more than 120° and equal or less than 180° by electrical angle; and
   supplying output voltage from said voltage-fed inverters to said motor.

2. A brushless D.C. motor driving and controlling method as set forth in claim 1, wherein said method further comprises the steps of obtaining outputs of said voltage-fed inverters and modulating said outputs to output pulse signals, each pulse signal having constant pulse widths within an entire conducting interval.

3. A brushless D. C. motor driving and controlling method as set forth in claim 1 wherein said method further comprises the steps of providing a rotor which includes permanent magnets in the interior thereof as a rotor of said brushless D.C. motor.

4. A brushless D.C. motor driving and controlling method as set forth in claim 3, wherein said method further comprises the steps of controlling said voltage-fed inverters so that a controlled output voltage therefrom has a phase that is advanced from the phase of the inverter output voltage with respect to induced voltage of said brushless D.C. motor, said phase with respect to induced voltage causing the motor current and the induced voltage of said brushless D.C. motor to have the same phase.

5. A brushless D.C. motor driving and controlling method as set forth in claim 1, wherein said conducting interval of said voltage-fed inverters is determined to be 180° by electrical angle.

6. A brushless D.C. motor driving a controlling method as set forth in claim 1, wherein said method further comprises the steps of:
   obtaining a first voltage at a neutral point by connecting one end of each of plural resistors together and connecting the other end of each of said resistors to each output terminal of said voltage-fed inverters,
   obtaining a second voltage at a neutral point by connecting one end of each stator winding of said brushless D.C. motor together, and
   detecting a magnetic pole position of said rotor of said brushless D.C. motor based upon a difference between said first voltage and said second voltage.

7. A brushless D.C. motor driving and controlling method as set forth in claim 6, wherein said conducting interval of said voltage-fed inverters is more than 120° and less than 180° by electrical angle.

8. A brushless D.C. motor driving and controlling method as set forth in claim 6, wherein said conducting interval of said voltage-fed inverters to be a predetermined interval which is equal or more than 140° and equal or less than 170° by electrical angle.

9. A brushless D.C. motor driving and controlling apparatus for driving a brushless D.C. motor, said apparatus comprising:
   a plurality of voltage-fed inverters connectable to a brushless D.C. motor; and
   a conducting interval determining means for determining a conducting interval of said voltage-fed inverters to be a predetermined interval which is more than 120° and equal or less than 180° by electrical angle.

10. A brushless D.C. motor driving and controlling apparatus as set forth in claim 9, including a modulating means for modulating outputs from said voltage-fed inverters so as to provide output pulse signals, each pulse signal having constant pulse widths within an entire conducting interval.

11. A brushless D.C. motor driving and controlling apparatus as set forth in claim 9, wherein said apparatus includes a rotor with permanent magnets in the interior of said rotor as a rotor of a brushless D.C. motor controlled by said apparatus.

12. A brushless D.C. motor driving and controlling apparatus as set forth in claim 10, further comprising a phase controlling means for controlling said voltage-fed inverters so that the phase of controlled inverter output voltage is advanced from the phase of the inverter output voltage with respect to induced voltage of a brushless D.C. motor controlled by said apparatus, said phase with respect to induced voltage causing the D.C. motor current and the induced voltage of a brushless D.C. motor controlled by said apparatus to be the same.

13. A brushless D.C. motor driving and controlling apparatus as set forth in claim 9, wherein said conducting interval determining means determines a conducting interval of said voltage-fed inverters to be 180° by electrical angle.

14. A brushless D.C. motor driving and controlling apparatus as set forth in claim 9, wherein said apparatus further comprises resistors which each have one end connected to each output terminal of each of said voltage-fed inverters and which each are connected to one another at their other end, a difference voltage outputting means for receiving a first voltage at a neutral point which voltage is obtained by connecting said other ends of each of said resistors, and for receiving a second voltage at a neutral point which voltage is obtained at the neutral point at which stator windings of said brushless D.C. motor are connected to one another, said difference voltage outputting means outputting a difference voltage between said first voltage and said second voltage, and a rotor position detecting means for detecting a magnetic pole position of said rotor of a brushless D.C. motor controlled by said apparatus based upon a difference voltage.

15. A brushless D.C. motor driving and controlling apparatus as set forth in claim 14, wherein said conducting interval determining means determines a conducting interval of said voltage-fed inverters to be a predetermined interval which is more than 120° and less than 180° by electrical angle.

16. A brushless D.C. motor driving and controlling apparatus as set forth in claim 14, wherein said conducting interval determining means determines a conducting interval of said voltage-fed inverters to be a predetermined interval which is equal or more than 140° and equal or less than 170° by electrical angle.

17. Electrical equipment comprising:

a brushless D.C. motor; and

D.C. motor driving and controlling apparatus according to claim 9 for driving said brushless D.C. motor.

\* \* \* \* \*